(12) United States Patent
Cho et al.

(10) Patent No.: US 7,529,541 B2
(45) Date of Patent: *May 5, 2009

(54) SERVER APPARATUS, MOBILE TERMINAL, CONTENTS DISTRIBUTION METHOD, CONTENTS RECEPTION METHOD, AND PROGRAM PRODUCT

(75) Inventors: Kenta Cho, Tokyo (JP); Naoki Kase, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 448 days.

This patent is subject to a terminal disclaimer.

(21) Appl. No.: 11/311,159

(22) Filed: Dec. 20, 2005

(65) Prior Publication Data

US 2006/0101150 A1     May 11, 2006

Related U.S. Application Data

(62) Division of application No. 10/177,674, filed on Jun. 24, 2002, now Pat. No. 7,034,853.

(30) Foreign Application Priority Data

Jun. 25, 2001   (JP)  ............................. 2001-191726

(51) Int. Cl.
*H04M 3/42*     (2006.01)
(52) U.S. Cl. .................................... 455/414.1; 370/359
(58) Field of Classification Search ........................ None
See application file for complete search history.

(56) References Cited

U.S. PATENT DOCUMENTS

| | | | |
|---|---|---|---|
| 5,899,810 A | 5/1999 | Smith | |
| 6,104,414 A | 8/2000 | Odryna et al. | |
| 6,505,238 B1 | 1/2003 | Tran | |
| 6,788,946 B2 * | 9/2004 | Winchell et al. | ............. 455/459 |
| 2002/0052908 A1 | 5/2002 | Cho et al. | |
| 2005/0114884 A1 * | 5/2005 | Diwan | .......................... 725/34 |

FOREIGN PATENT DOCUMENTS

| | | |
|---|---|---|
| EP | 0930755 A1 | 7/1999 |
| EP | 1087323 A1 | 7/1999 |
| EP | 1 066 867 A2 | 1/2001 |
| EP | 1083759 A1 | 3/2001 |
| JP | 2000-287071 | 10/2000 |
| WO | WO 97/12314 | 4/1997 |

OTHER PUBLICATIONS

European Search Report dated Apr. 15, 2005.
European Search Report dated Jan. 26, 2005.
Japanese Office Action dated Jun. 28, 2005.
Extended European Search Report dated Mar. 10, 2008 in Application No. 07023211.1.

* cited by examiner

*Primary Examiner*—Charles N Appiah
*Assistant Examiner*—Jaime M Holliday
(74) *Attorney, Agent, or Firm*—Banner & Witcoff, Ltd

(57) ABSTRACT

A multiple-contents distribution in a client and server system is disclosed. The multiple-contents contain contents-pieces, which are to be distributed to a set of clients including mobile phone terminals. The set of clients are registered with the server in response to registration requests. The server determines an order of the registered set of clients. The server then initiates a distribution of the contents-pieces to the registered sets of clients, wherein the contents-pieces are selected in accordance with the order of the clients.

7 Claims, 18 Drawing Sheets

| Session ID | Apparatus ID of session leader terminal | Apparatus ID group of participant terminals |
|---|---|---|
| 1 | 090XXXXXXXX | 090YYYYYYYY, 090··· |
| 2 | : | : |
| 3 | : | : |
| : | : | : |

| Session ID | Apparatus ID of session leader terminal | Apparatus ID group of participant terminals | Service |
|---|---|---|---|
| 1 | 090XXXXXXXX | 090YYYYYYYY, 090··· | Game A |
| 2 | : | : | Game B |
| 3 | : | : | Station peripheral information |
| : | : | : | |

| Session ID | ... | Maximum delay time |
|---|---|---|
| 1 | | |
| 2 | | |
| 3 | | |
| ⋮ | | |

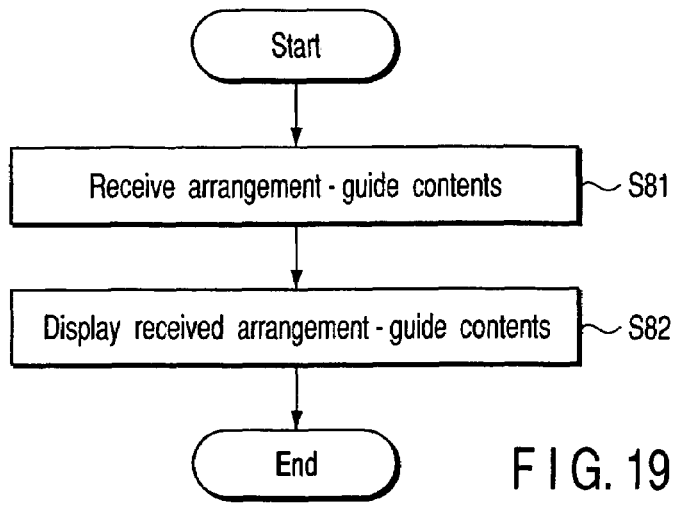
FIG. 19
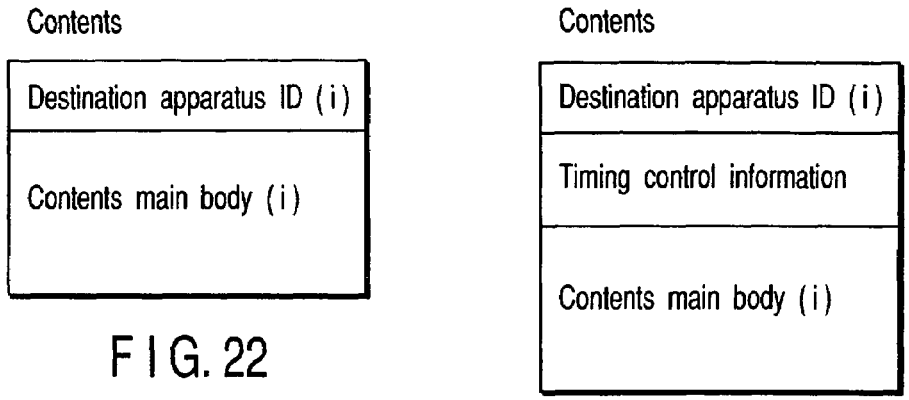
FIG. 22
FIG. 23
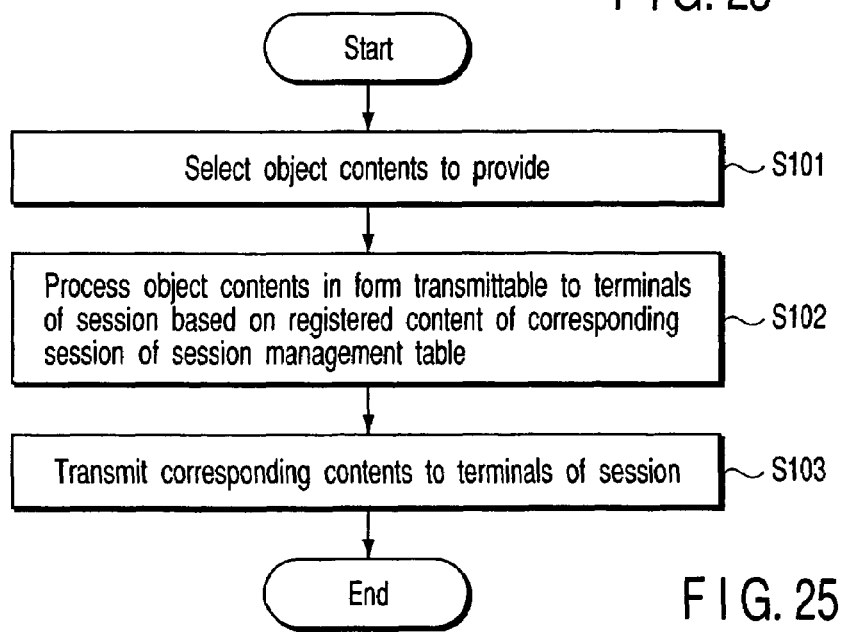
FIG. 25

SERVER APPARATUS, MOBILE TERMINAL, CONTENTS DISTRIBUTION METHOD, CONTENTS RECEPTION METHOD, AND PROGRAM PRODUCT

CROSS-REFERENCE TO RELATED APPLICATIONS

This application is a divisional application based on co-pending application Ser. No. 10/177,674 filed on Jun. 24, 2002 entitled "Server Apparatus, Mobile Terminal, Contents Distribution Method, Contents Reception Method, and Program Product", which is based upon and claims the priority benefit from prior Japanese Patent Application No. 2001-191276, filed Jun. 25, 2001, the entire contents of these applications are incorporated herein by reference.

BACKGROUND OF THE INVENTION

1. Field of the Invention

The present invention relates to methods, apparatuses, and a computer-program product for multiple-contents distribution in a client and server system. The present invention also relates to mobile-terminal apparatuses and a computer-program product.

2. Description of the Related Art

Services other than voice communication between cellular phones are known. Examples of the services include e-mail services and chat services between the cellular phones. These are services for exchanging multimedia messages between two cellular phones.

There is also a message board service in which a plurality of users can write the messages. It is possible to access a message board from the cellular phone, freely browse the message board, or write the messages.

There is also a game service in which a plurality of users can play a game via a network even in remote areas. Examples of the game include Japanese chess and reverse which are played by adversaries using the respective cellular phones. Moreover, there is also a specific game for whose high scores an unspecified number of users compete with one another based on ranking information released by a server.

In these conventional services, basically the users only independently operate the respective cellular phones. A system has not been realized yet in which a display screen or sound output function disposed in the cellular phone are linked among terminals and better services are provided.

BRIEF SUMMARY OF THE INVENTION

The present invention has been developed in consideration of the above-described circumstances, and an object thereof is to provide methods, apparatuses and a computer program product in a client and server system for distributing multiple-contents containing contents-pieces to a set of clients.

According to one embodiment of the present invention, there is provided a multiple-contents distribution method in a client and server system of distributing multiple-contents containing contents-pieces to a set of clients, the multiple-contents distribution method comprising: accepting registration requests to register the set of clients with the server; receiving a request from at least one of the registered set of clients; distributing the contents-pieces of the multiple-contents to the registered set of clients upon receiving the request, wherein each client receives respective contents-pieces corresponding to each client.

According to one embodiment of the present invention, there is provided a server apparatus which distributes multiple-contents containing contents-pieces to a set of clients, the server apparatus comprising: a storage device which stores the multiple-contents; an accepting device which accepts registration requests to register the set of clients with the server apparatus; a receiving device which receives a request from at least one of the registered set of clients; a contents handler which handles the multiple-contents in the storage device, wherein the contents handler selects the contents-pieces of the multiple-contents; and a distribution controller which controls a distribution of the multiple-contents, wherein the distribution controller transmits the contents-pieces of the multiple-contents selected by the contents handler to the registered set of clients.

According to one embodiment of the present invention, there is provided a mobile terminal which communicates with a server apparatus distributing multiple-contents containing contents-pieces, the mobile terminal comprising: a request sender which sends a registration request to the server apparatus in order to share a session with other mobile terminals; a contents receiver which receives one of the contents-pieces assigned to the mobile terminal from the server apparatus; and a reproduction device which reproduces the received one of the contents-pieces under the session.

BRIEF DESCRIPTION OF THE SEVERAL VIEWS OF THE DRAWING

FIG. 19 is a flowchart showing one example of process steps of a cellular phone terminal in the procedure for arranging the terminals in the embodiment;

FIG. 22 is a diagram showing one example of the contents not including timing control information of the embodiment;

FIG. 23 is a diagram showing one example of the contents including the timing control information of the embodiment;

FIG. 25 is a flowchart showing one example of process steps of a server in the contents distribution procedure of the embodiment;

DETAILED DESCRIPTION OF THE INVENTION

An embodiment of the present invention will be described hereinafter with reference to the drawings.

Figure 1:
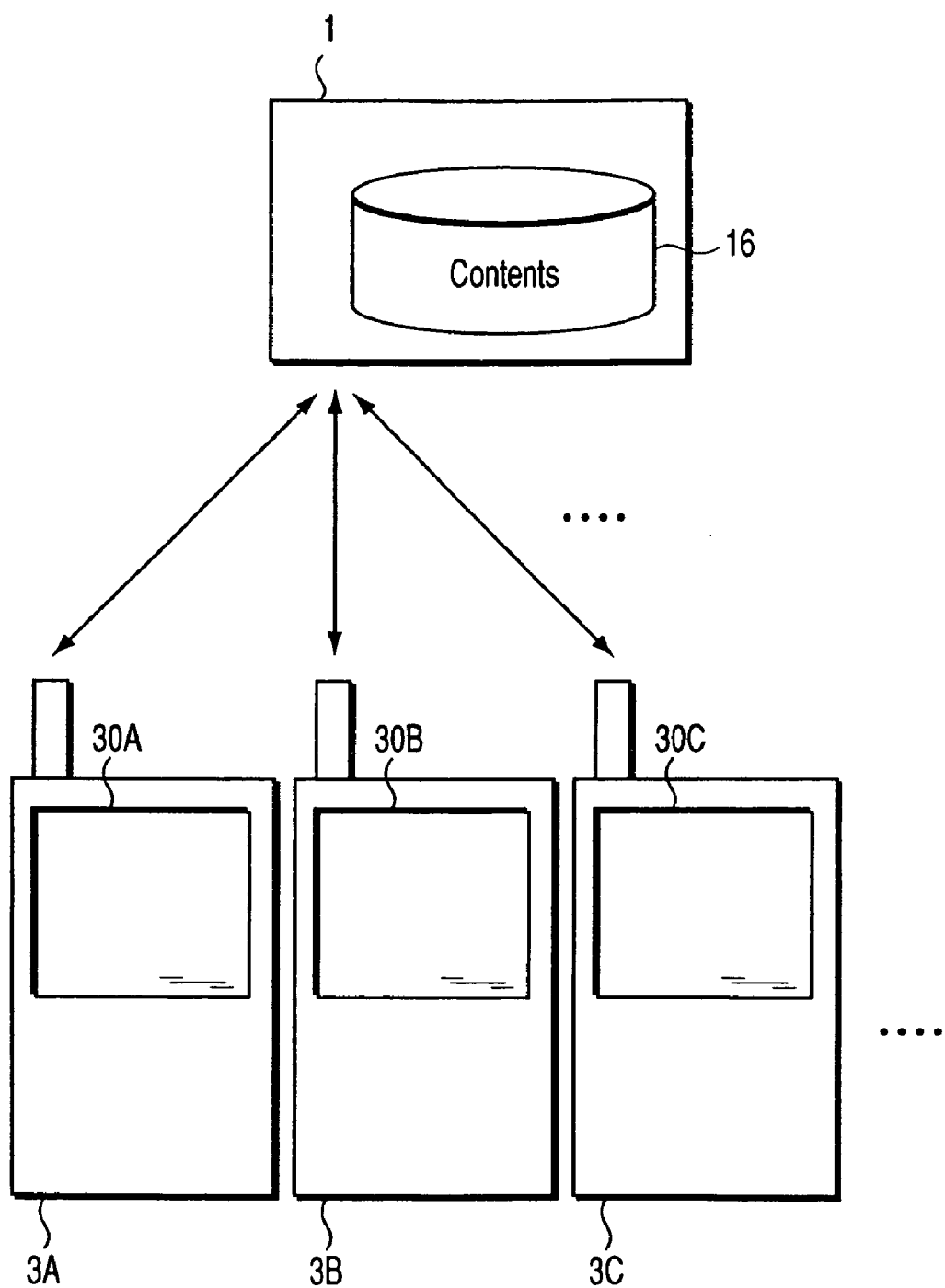
FIG. 1 is a diagram showing a configuration of a network service system according to one embodiment of the present invention.

FIG. 1 shows a configuration of a network service system according to one embodiment of the present invention. This embodiment provides contents distribution services in which cellular phone terminals collaborate to enjoy special contents, i.e., multi-terminal type contents. A contents distribution service is available when two or more cellular phone terminals are registered in this system to create one same session temporally shared by these terminals.

As shown in FIG. 1, the present system includes a plurality of cellular phone terminals 3A-3C and a server 1 which can communicate with one another via a cellular phone network employing a radio link. This network may be a communication common carrier network. In the present system, data communications in accordance with a TCP/IP protocol for example are performed in addition to phonetic communications between the cellular phone terminals 3A-3C and server 1.

Hereinafter, cellular phone terminal "3" denotes ether one of cellular phone terminals 3A, 3B, or 3C. The cellular phone terminal 3 includes a microphone or speaker, button or dial (not shown), display screen 30, and an apparatus or function for performing usual voice communication with another cellular phone terminal via the cellular phone network. Apparatuses or functions for receiving a predetermined service from the server 1, such as a TCP/IP function, HTTP function, decode function of coded contents, decipher function of enciphered contents, browser function, and GUI function are also included. The cellular phone terminal may include a function of locally communicating the cellular phone terminal in the vicinity not via the cellular phone network (e.g., a communication function by infrared input/output or Bluetooth).

The server 1 has a function of supplying a predetermined service (such as a contents distribution service, information providing service, and game service) including distribution of image contents 16 to a plurality of cellular phone terminals 3 sharing one session. The server 1 may directly be connected to the cellular phone network, or connected to the cellular phone network through an external network, e.g., Internet. In FIG. 1, only one server is shown, but a plurality of servers may be disposed. The cellular phone terminals access the server 1 via a radio base station (not-shown) in the vicinity.

In the present embodiment, to receive the service from the server 1, first a request issued to the server 1 by one cellular phone terminal 3 is taken as an event to start generating one session. The cellular phone terminal 3 to first issue the request will be hereinafter referred to as a "session leader terminal" (also referred to as a "leader terminal"). One or a plurality of cellular phone terminals 3 other than the session leader terminal belonging to one session will also be referred to as a "participant terminal". Note here that each cellular phone terminal 3 can be either the session leader terminal or the participant terminal.

In the present embodiment, a plurality of users bring the cellular phone terminals 3A-3C to generate one session. The display screens 30A-30C of the plurality of cellular phone terminals 3A-3C sharing the session are linked, or contents displayed in the plurality of display screens 30A-30C of cellular phone terminals 3A-3C are linked, so that the multi-terminal type contents service provided from the server 1 can be achieved.

For example, display screens 30A-30C are linked and utilized as a wide screen (e.g., displaying one content screen over the cellular phone terminals 3A-3C). Alternatively, display screens 30A-30C are used as a multi-screen (e.g., displaying independent contents screens for one service in cellular phone terminals 3A-3C). Moreover, a plurality of cellular phone terminals sharing one session are divided into groups. Wide screens are formed in each groups, and the wide screens of groups are used as the multi-screen.

To actually start the service, a step of determining the arrangement of the plurality of cellular phone terminals 3A-3C forming one session, and notifying the respective cellular phone terminals 3A-3C is performed. For the arrangement of the terminals, various variations are considered. In one example, it is assumed that all the cellular phone terminals 3A-3C in one session are arranged in one horizontal row. In this case, for example, an order from left or right is assigned to each cellular phone terminal 3, and the terminal is notified of the order.

Additionally, as a mode of the arrangement of the terminals, in addition to one horizontal row, various variations are possible such as a longitudinal direction, matrix form, and special arrangement mode.

Figure 2:
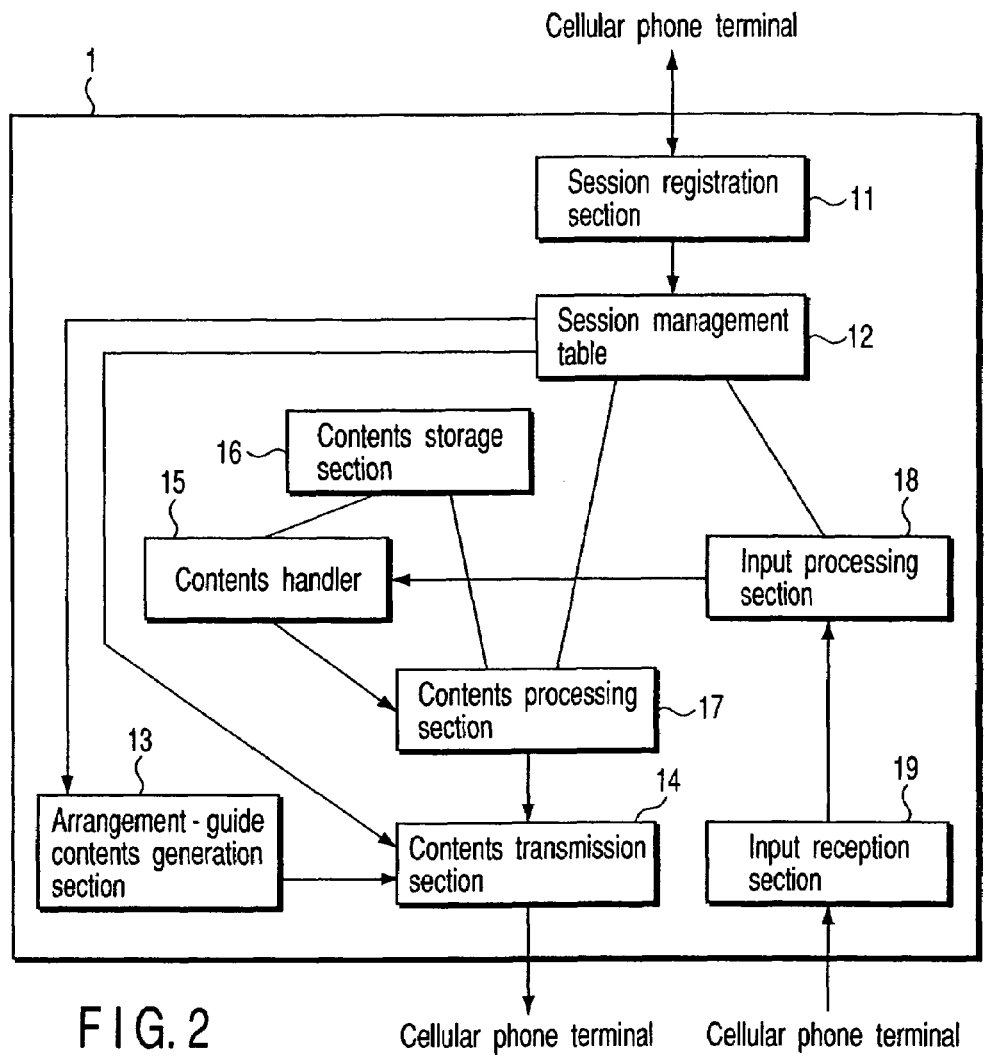
FIG. 2 is a diagram showing a configuration of a server according to the embodiment.

FIG. 2 shows a configuration of a server according to the embodiment.

As shown in FIG. 2, the present server 1 includes a session registration section 11, session management table 12, arrangement-guide contents generation section 13, contents transmission section 14, contents handler 15, contents storage section 16, contents processing section 17, input processing section 18, and input reception section 19. Additionally, FIG. 2 shows a part related with the following description. Moreover, details of components will be described later.

Figure 3:
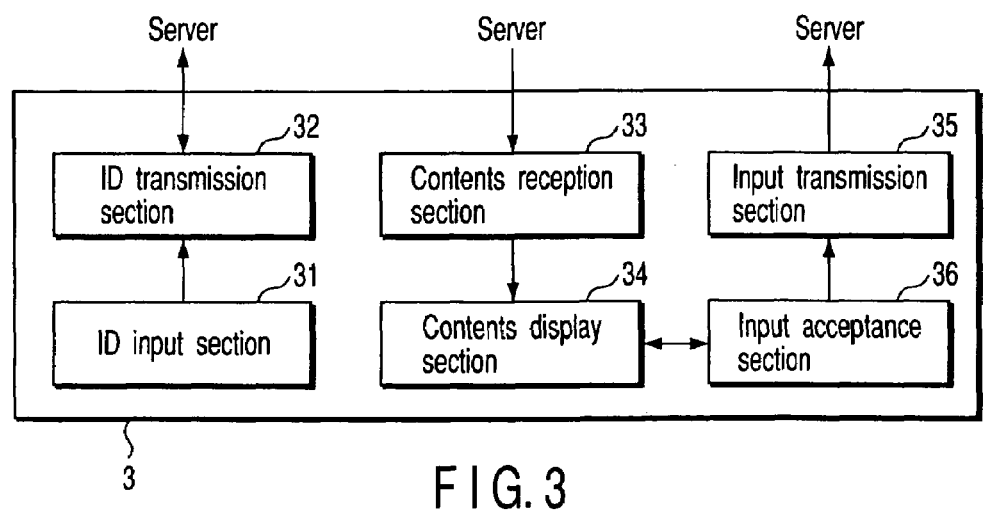
FIG. 3 is a diagram showing a configuration of a cellular phone terminal according to the embodiment.

FIG. 3 shows a configuration of the cellular phone terminal according to the embodiment.

As shown in FIG. 3, the cellular phone terminal 3 includes an ID input section 31, ID transmission section 32, contents reception section 33, contents display section 34, input transmission section 35, and input acceptance section 36. Additionally, FIG. 3 shows a part related with the following description. Moreover, the details of components will be described later.

Figure 4:
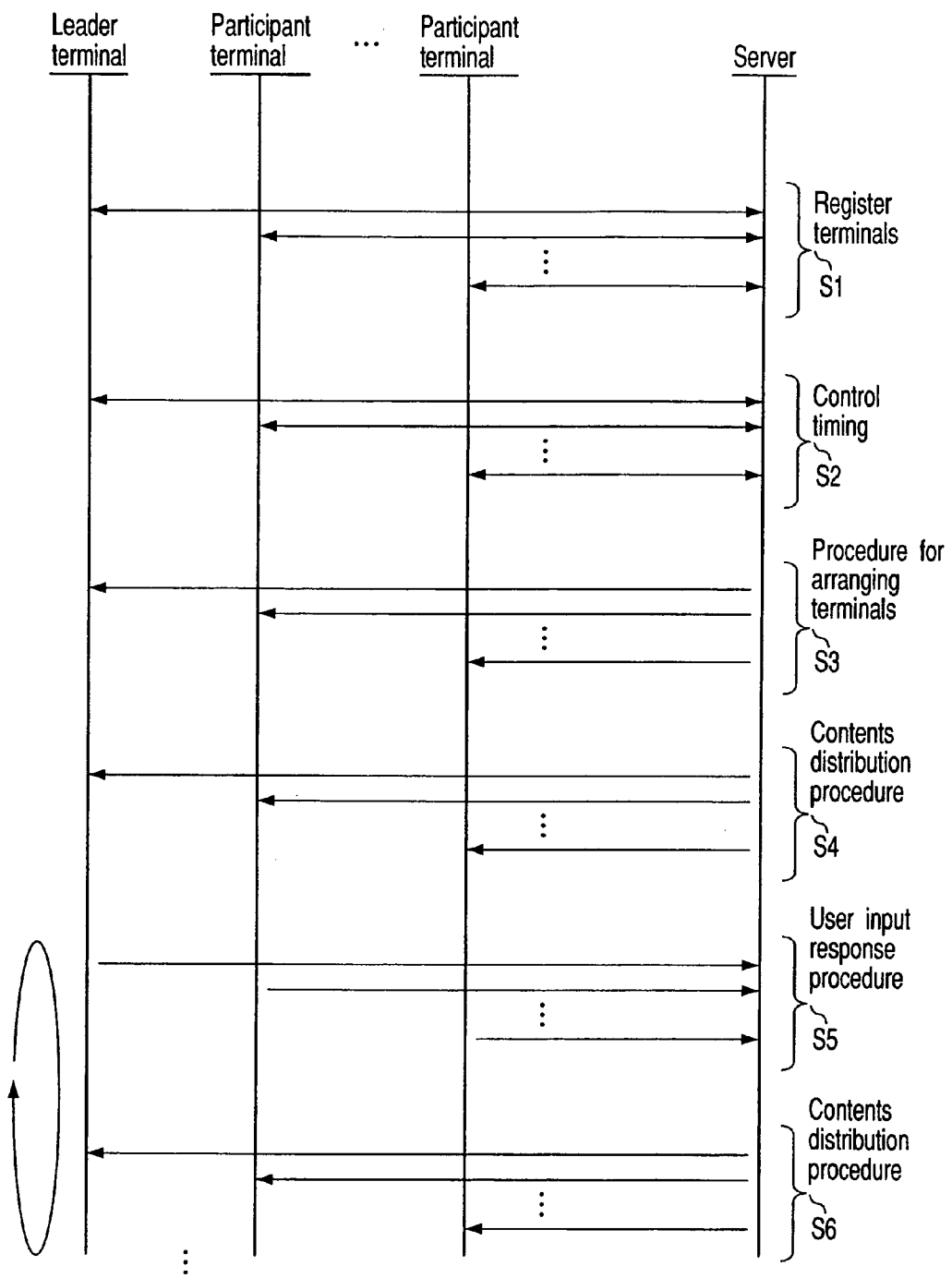
FIG. 4 is a diagram showing one example of a basic sequence of the embodiment.

FIG. 4 shows one example of a basic sequence of the present embodiment.

First, a terminal registration procedure of registering the terminals sharing one session in the server 1 is performed among one session leader terminal 3, one or more participant terminals 3, and server 1 (S1).

Subsequently, a timing control procedure of establishing synchronization concerning a start timing of contents display among the terminals is performed (S2). The timing control procedure may constantly be performed regardless of the kind of the service or contents. Otherwise, it is selected whether or not to perform the procedure in accordance with the kind of the service or contents.

Next, a procedure for arranging the terminals is performed in which the server 1 distributes information for aligning the terminals in a specific order (notifying the terminals of the assigned order) to the respective cellular phone terminals 3A-3C belonging to the session (S3). For example, the image contents indicating any number of 1 to n are distributed to n cellular phone terminals 3A-3C which belong to the session. Each terminal user refers to the number indicated by the terminal, compares the image displayed in the terminal with images displayed in the other terminals, and can arrange all the terminals in a predetermined order in corporation with other users. Note that, this procedure for arranging the terminals may be skipped depending on the content of the service.

Subsequently, a contents distribution procedure is performed in which the server 1 distributes the contents to the respective cellular phone terminals 3A-3C belonging to the session (S4). In the present embodiment, the contents are distributed to each cellular phone terminal 3 in accordance with the order assigned to the terminal. Examples of the mode include a mode of distributing/supplying n divided contents of one image content to n cellular phone terminals 3A-3C, a mode of distributing/supplying n contents related with one another to n cellular phone terminals 3A-3C, and the like. Moreover, the user links the contents displayed in the respective cellular phone terminals 3A-3C, and receives the predetermined service.

When the session receives a service for only displaying the contents distributed from the server 1 in the respective cellular phone terminals 3A-3C, and all the contents to be distributed in the session are distributed, the session terminates.

There are a service whose content changes by dialog with the server, a service whose scenario makes progress, a service in which a real-time user operation needs to be returned to the server with respect to the displayed contents, and the like. In any service, after or while the distributed contents are displayed, a user input response procedure (S5) of accepting an input from the user in all or some of the cellular phone terminals 3 belonging to the session, and transmitting the user input to the server 1 from all or some of the cellular phone terminals 3, and a contents distribution procedure (S6) of distributing the contents to the respective cellular phone terminals 3 belonging to the session from the server 1 in response to the user input are appropriately repeatedly performed, for example, in accordance with the content of the service, progress of the scenario, or distribution situation of the contents.

Note that, in a certain procedure of FIG. 4, communication is performed between all or some of the cellular phone terminals 3 and the server 1. However, the communication between the terminals and the server may not necessarily be performed in timings shown in FIG. 4, and may be performed simultaneously or in parallel. This respect is also similar in a sequence diagram described later.

Here, the terminal registration procedure, timing control procedure, procedure for arranging the terminals, and contents distribution procedure/user input response procedure will be described hereinafter in detail.

First, the terminal registration procedure will be described.

Figures 5, 6:
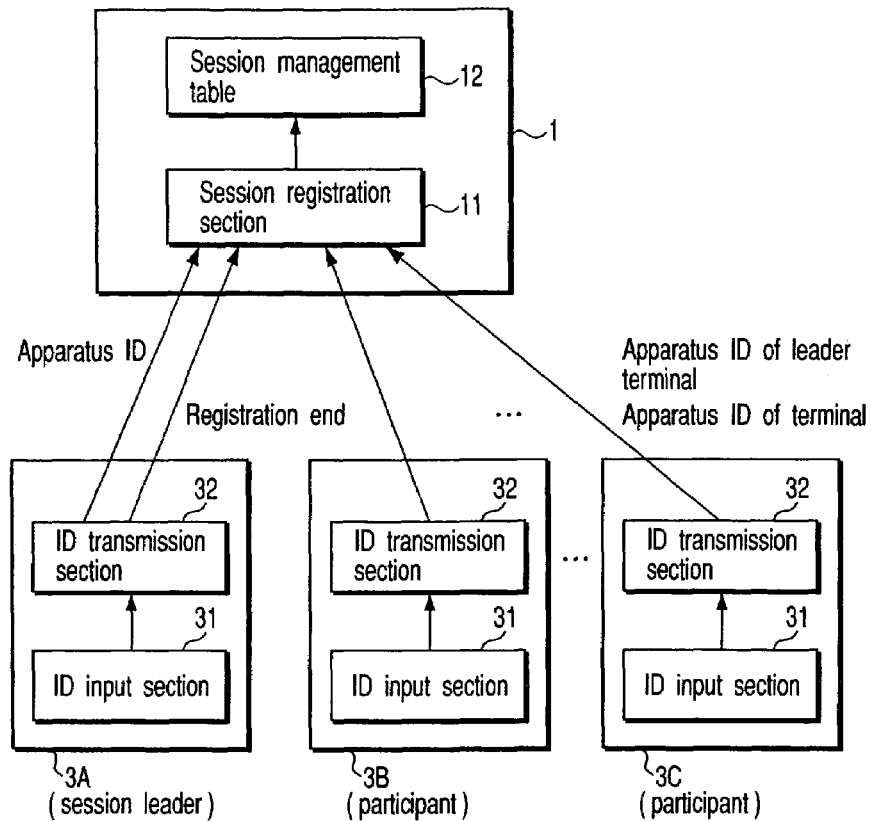
FIG. 5 is a diagram showing a part related with a terminal registration procedure in the system configuration of the embodiment.
FIG. 6 is a diagram showing one example of a session management table.

FIG. 5 shows a part related with the terminal registration procedure in the system configuration.

To register apparatus IDs of the cellular phone terminals 3 participating in the session into the session management table 12, the session registration section 11 of the server 1 accepts the registrations of the apparatus IDs from the cellular phone terminal 3 as the session leader terminal of the session and the cellular phone terminal 3 as the participant terminal of the session. Moreover, the session registration section performs registration/update/deletion with respect to the session management table 12. Additionally, examples of the apparatus ID include a cellular phone number (e.g. format of 090XXXXXXXX) of the cellular phone terminal 3.

The session management table 12 of the server 1 holds information concerning the session for each session.

FIG. 6 shows one example of the session management table 12. In this example, session identification information for identifying the session (session ID), "apparatus ID" of the session leader terminal, "apparatus ID" of the participant terminal, and "arrangement information" indicating the arrangement of the terminals having the respective apparatus IDs are held for each session. The arrangement information can specify, for example, a numeric value indicating the order of the terminal from left or right, or the order.

Figures 7, 8, 9:
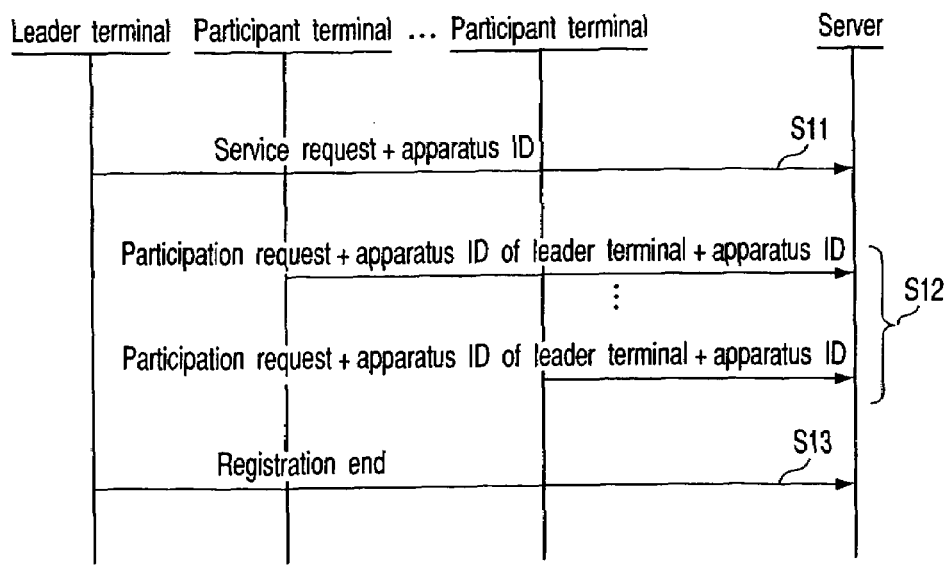
FIG. 7 is a diagram showing another example of the session management table.
FIG. 8 is a diagram showing still another example of the session management table.
FIG. 9 is a diagram showing one example of the sequence of terminal registration procedure of the embodiment.

FIG. 7 shows another example of the session management table 12. In this example, as compared with FIG. 6, the arrangement information assigned to each apparatus ID is not held. In this case, for the "arrangement information" assigned to each apparatus ID in the session, the apparatus ID is assumed to be specified with the order held in an entry of the session of the session management table 12. For example, the order in which the apparatus ID is held in the entry of the session of the session management table 12 is assumed to indicate the order of the terminal having the apparatus ID from left or right.

In addition to the above-described items, various items may be added to the session management table 12 and carried out.

For example, for each session, when the user of the cellular phone terminal 3 can select a desired service from a plurality of services, or when the user selects the service to supply from the plurality of services in accordance with predetermined conditions on a server 1 side, the session may hold the content of the service to supply. FIG. 8 shows one example obtained by adding an item of content of service to the configuration of FIG. 7. Of course, the item of content of service may also be added to the configuration of FIG. 6.

Profile information concerning the display screen of the cellular phone terminal 3 may be associated with the apparatus ID of the cellular phone terminal 3 and held. Examples of the profile information include a screen size, type of display such as monochromatic display and color display, and the like. In this case, the arrangement information can be determined in consideration with the profile information.

Referring again to FIG. 3, the ID input section 31 of the cellular phone terminal 3 accepts the apparatus ID input from the user (the apparatus ID of the user's own terminal for the leader terminal, or the apparatus IDs of the leader terminal and user's own terminal for the participant terminal) via the button on the cellular phone terminal 3, and transmits the input to the ID transmission section 32.

The ID transmission section 32 of the cellular phone terminal 3 transmits the apparatus ID received from the ID input section 31 to the session registration section 11 on the server 1 by radio.

Additionally, the cellular phone terminal 3 may include: an infrared input/output function; local communication function such as Bluetooth; function of transmitting the apparatus ID of the terminal to the cellular phone terminal 3 as the participant terminal, when the terminal is the session leader terminal; or function of receiving the apparatus ID of the terminal from the cellular phone terminal 3 as the session leader terminal and supplying the ID to the ID transmission section 32, when terminal is the participant terminal. Thereby, the apparatus ID of the session leader terminal may automatically be inputted. In this case, an operation in which the user of the participant terminal inputs the apparatus ID of the session leader terminal to the cellular phone terminal 3 of the user can be saved.

Moreover, each cellular phone terminal 3 may include a function of transmitting the apparatus ID of the terminal to the ID transmission section 32, so that the apparatus ID of the terminal may automatically be inputted. In this case, an operation in which the user of each terminal manually inputs the apparatus ID of the cellular phone terminal 3 of the user can be saved.

When both the input of the apparatus ID of the session leader terminal and the input of the apparatus ID of the user's terminal are automated, the ID input section 31 can be omitted. On the other hand, when both the input of the apparatus ID of the session leader terminal and the input of the apparatus ID of the user's terminal are automated, and the ID input section 31 is disposed, the user can select whether to automatically or manually input the apparatus ID (e.g., the ID can manually be inputted, when local communication means breaks down).

FIG. 9 shows one example of a sequence of terminal registration procedure.

Figure 10:
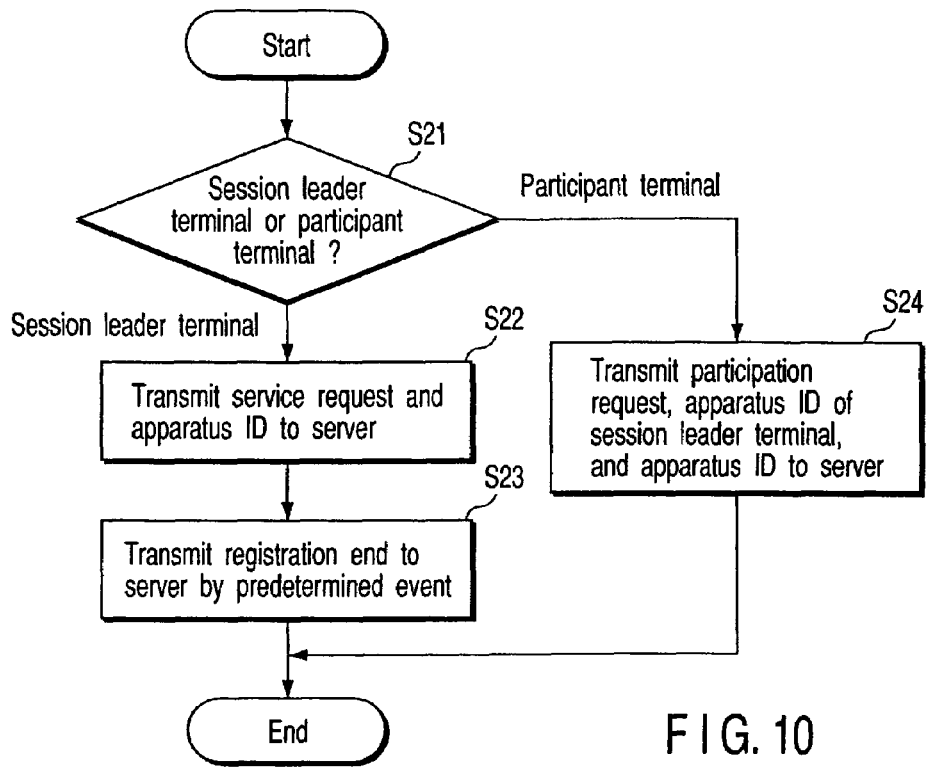
FIG. 10 is a flowchart showing one example of process steps of the cellular phone terminal in the terminal registration procedure of the embodiment.

FIG. 10 shows one example of process steps of the cellular phone terminal 3 in the terminal registration procedure.

Figure 11:
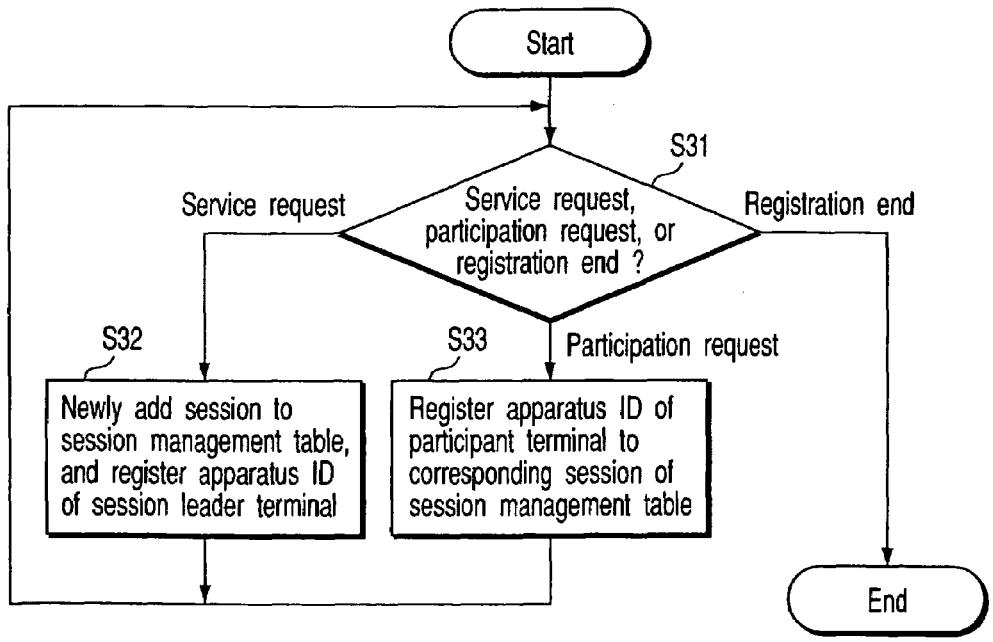
FIG. 11 is a flowchart showing one example of process steps of the server in the terminal registration procedure of the embodiment.

FIG. 11 shows one example of process steps of the server 1 in the terminal registration procedure.

First, for example, the user operates the user's cellular phone terminal 3 (inputs the apparatus ID if necessary) and indicates a request for a desired service. Taking this event the cellular phone terminal 3 as the session leader terminal transmits the service request and the apparatus ID to the server 1 (S11) (S21, S22).

Upon receiving the service request, the server 1 newly adds a session to the session management table 12 (assigns a session ID), and registers the terminal ID of the session leader terminal given together with the service request in an entry of the session (S11) (S31, S32).

Subsequently, for example, to participate in the session, the user operates the user's cellular phone terminal 3 (inputs the apparatus ID if necessary) and requests participation. Taking this event, the cellular phone terminal 3 as the participant terminal transmits the participation request, the apparatus ID of the session leader terminal, and the apparatus ID to the server 1 (S12) (S21, S24).

Upon receiving the participation request, the server 1 specifies the corresponding session from the session management table 12 based on the terminal ID of the session leader terminal given together with the participation request, and registers the terminal ID of the participant terminal given together with the service request in the entry of the specified session. This process is performed with respect to each participant terminal (S12) (S31, S33).

Subsequently, for example, the user operates the cellular phone terminal 3 as the session leader terminal and instructs notification of registration end. Taking this event, the cellular phone terminal 3 as the session leader terminal transmits the registration end to the server 1 (S13) (S23).

Upon receiving the registration end, the server 1 ends the terminal registration procedure (S13) (S31), and starts an actual service process. At this moment, the server 1 starts the session that is generated in the above described registration procedure and to be shared by the terminals that have requested the registration.

For the number of the cellular phone terminals 3 which can share one session, there are: a method of limiting the number to one predetermined number; a method of limiting the number to any one of a plurality of predetermined numbers; a method of setting an upper limit number, a method of setting a lower limit number; a method of setting the upper and lower limit numbers; and a method of not especially imposing a restriction. Moreover, there is also a method of determining any one of the above-described methods for each service or for each content.

Examples of the registration end include: a method in which the cellular phone terminal 3 as the session leader terminal transmits the registration end to the server 1 with an elapse of predetermined time after transmitting the service request to the server 1; a method in which the server 1 judges the ending of the registration with an elapse of predetermined time after receiving the service request; and a method of judging the ending of the registration on a server 1 side, when the number of terminals constituting the session is a predetermined number, or there is the predetermined upper limit number in the number of terminals constituting the session, and when the number of terminals registered with respect to the session reaches the predetermined number, or the upper limit number.

When the cellular phone terminal 3 transmits a request to the server 1, the server 1 may return a response to the request to the corresponding cellular phone terminal 3.

The server 1 can provide a plurality of services, and the user of the cellular phone terminal 3 can select a desired service from a plurality of services. In this case, examples of a method of designating the service to the server 1 from the cellular phone terminal 3 include: a method in which a session leader transmits service designation information indicating the designated service in addition to the service request; a method in which the session leader transmits the service designation information in addition to the registration end; and a method in which any one of the cellular phone terminals 3 transmits the service designation information to the server 1 after completion of the terminal registration procedure. Moreover, there is also a method in which each terminal 3 transmits the service designation information to the server 1 after the completion of the terminal registration procedure, and the contents of the service are determined based on the collected service designation information according to a rule of majority on the server 1 side.

Figure 12:
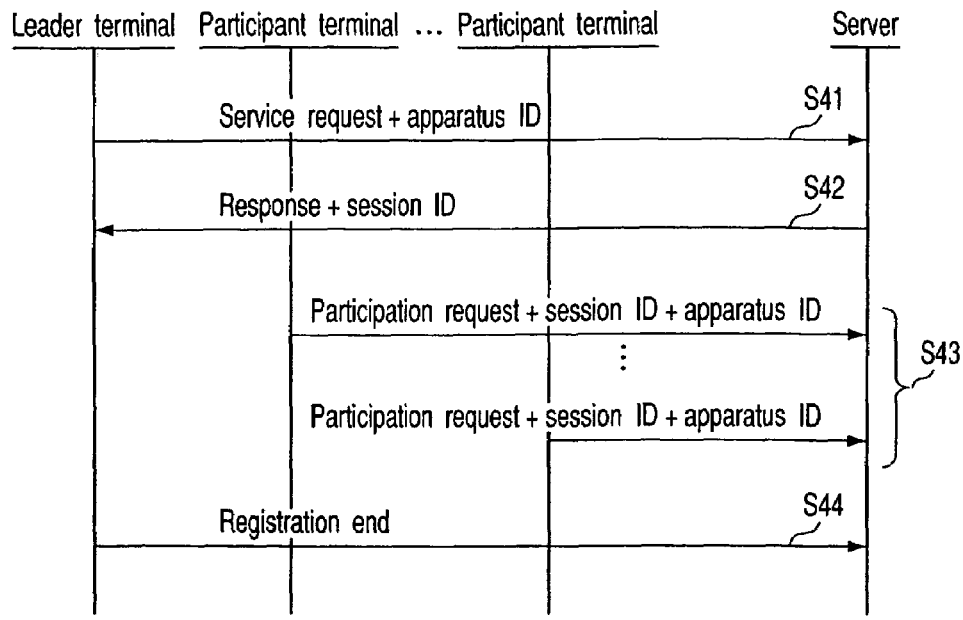
FIG. 12 is a diagram showing another example of the sequence of the terminal registration procedure of the embodiment.

Besides the above-described procedures, there are variations of the terminal reception procedure. For example, as shown in FIG. 12, the server 1 having received the service request from the cellular phone terminal 3 as the session leader terminal returns the session ID assigned to the session, and the cellular phone terminal 3 as the participant terminal may transmit the session ID to the server 1, not the apparatus ID of the session leader terminal. Additionally, for the session ID, there are: a method in which the session leader terminal transfers the ID to the participant terminal by the infrared input/output or Bluetooth; and a method in which the user reads the ID displayed in the session leader terminal and manually inputs the ID into each participant terminal.

In the above-described steps, each cellular phone terminal 3 transmits the ID to the server 1 and performs the terminal registration procedure. However, for the apparatus ID of the participant terminal, for example, in a method, the cellular phone terminal 3 as the session leader terminal transmits the apparatus IDs of all the participant terminals in addition to the apparatus ID of the terminal to the server 1, and the server 1 calls all the participant terminals. In another method, when there are a plurality of participant terminals, one of the participant terminals transmits the apparatus IDs of all other participant terminals in addition to the apparatus ID of the terminal to the server 1, and the server 1 calls all the other participant terminals.

A timing control procedure will next be described.

As described above, for the timing control procedure, there are: a configuration in which the procedure is constantly carried out regardless of the contents; a configuration in which it is selected whether or not to carry out the procedure in accordance with the contents; and a configuration in which the procedure is never carried out.

Figure 13:
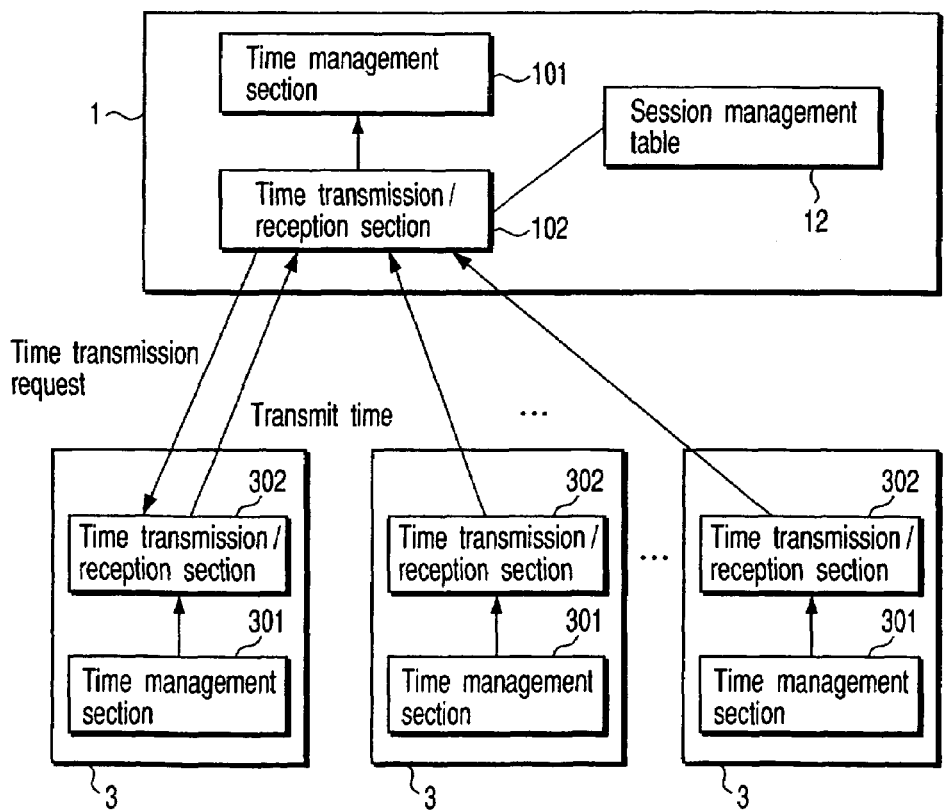
FIG. 13 is a diagram showing a part related with a timing control procedure in the system configuration of the embodiment.

FIG. 13 shows a part related with the timing control procedure in the system configuration.

A time management section 101 on the server 1 and a time management section 301 on the cellular phone terminal 3 have a function of notifying the present time.

A time transmission/reception section 102 on the server 1 transmits a transmission request of the present time to a time transmission/reception section 302 on the cellular phone terminal 3, receives the present, measures a time required for the communication to the cellular phone terminal 3 from the server 1, and sets an item of delay time in the session management table 12.

The time transmission/reception section 302 on the cellular phone terminal 3 receives a time transmission request from the server 1, makes an inquiry to the time management section 301, and transmits the received present time to the server 1.

Figure 14:
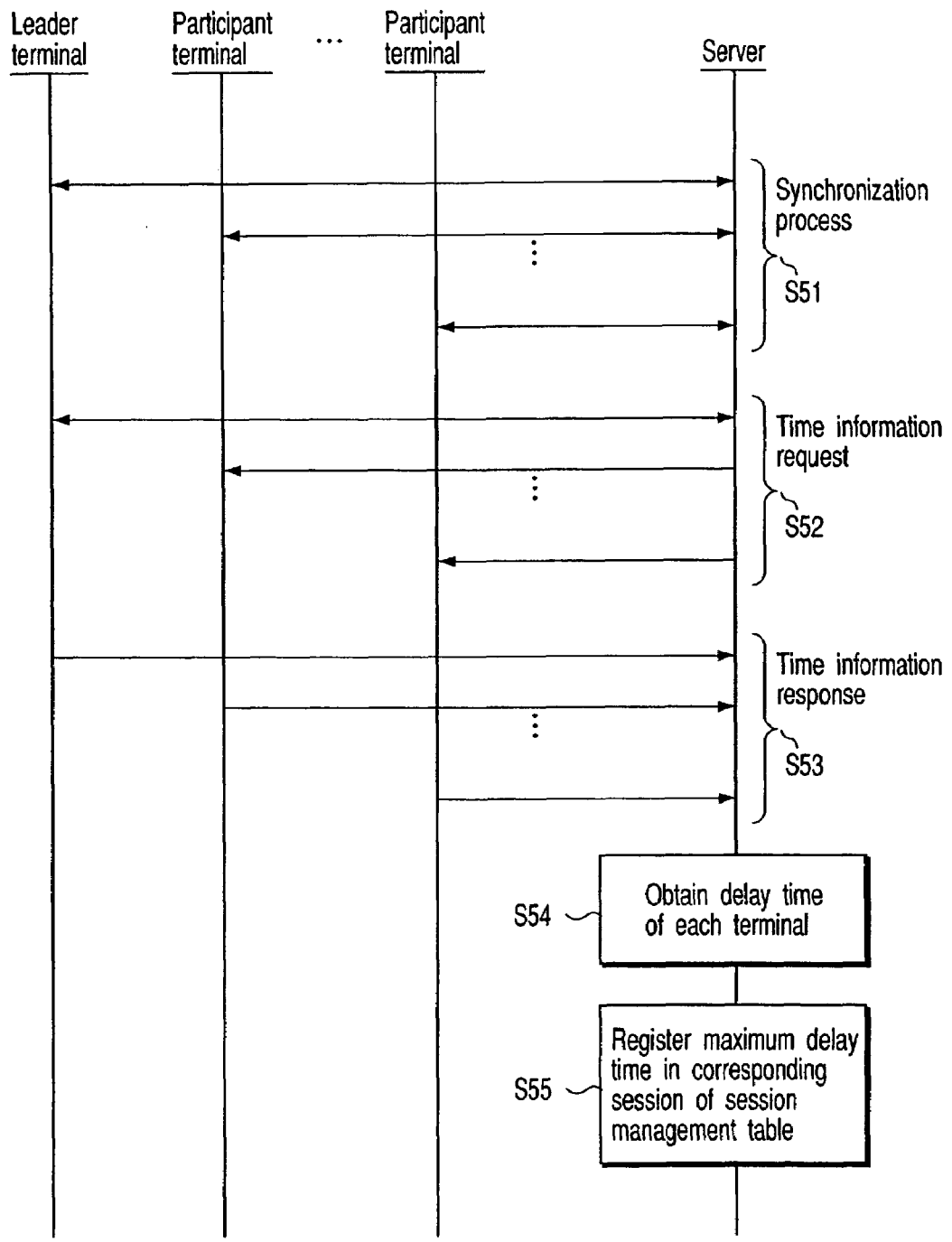
FIG. 14 is a diagram showing one example of a sequence of timing control procedure of the embodiment.

FIG. 14 shows one example of the sequence of timing control procedure and the process steps of the terminals and server.

First, between each cellular phone terminal 3 and the server 1, global positioning systems (GPS) and network time protocol (NTP) are used, and a procedure for synchronizing the cellular phone terminal 3 with the time (clock) of the server 1 is performed (S51).

Subsequently, a time transmission request is transmitted to each cellular phone terminal (here, it is assumed that each terminal is represented by i) from the server 1 (S52). A request transmission time at which the time transmission request is transmitted is assumed to be $t_0$.

Subsequently, each cellular phone terminal i transmits present time $t_i$ of the terminal to the server 1 (S53).

The server 1 obtains a delay time $\Delta t_i$=present time $t_i$—request transmission time $t_0$ of the cellular phone terminal i from the present time $t_i$ and request transmission time $t_0$ received from the cellular phone terminal I, and stores the delay time (S54). The delay time $\Delta t_i$ is obtained with respect to all the terminals i of the session, and stored.

Additionally, measurement of S52 to S54 is repeated several times, and measured values are averaged, so that the delay time $\Delta t_i$ may be obtained.

Subsequently, the delay times $\Delta t_i$ of all the terminals i of the session are compared with one another, and a maximum delay time $\Delta t_{i\_}$max is obtained, and recorded in the entry of the corresponding session of the session management table 12 (S55).

Figures 15, 16:
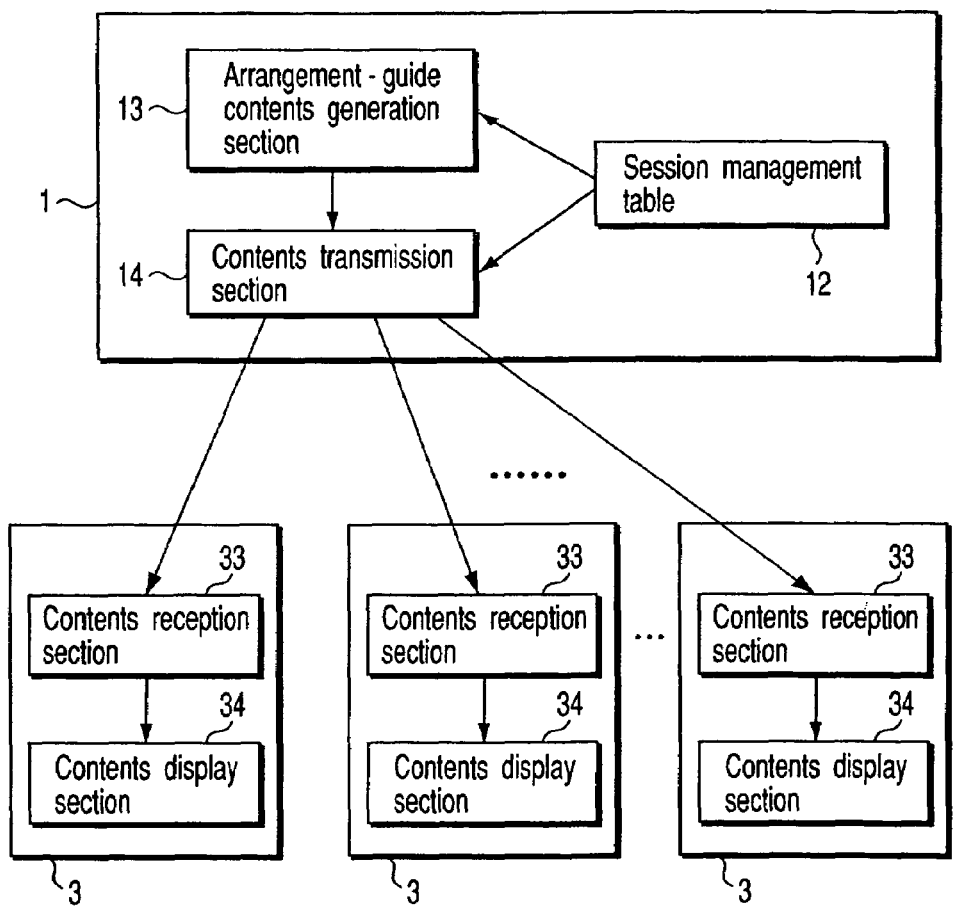
FIG. 15 is a diagram showing another example of the session management table.
FIG. 16 is a diagram showing a part related with a procedure for arranging the terminals in the system configuration of the embodiment.

FIG. 15 shows an example of the session management table 12 in this case. Additionally, the maximum delay time $\Delta t_{i\_}$max may be associated with the terminal ID of the terminal having this time and stored.

Here, a method of utilizing this maximum delay time $\Delta t_{i\_}$max will be described.

When the server 1 transmits data to a plurality of cellular phone terminals 3, the delay time could differ with each cellular phone terminal 3. Therefore, when the server 1 distributes the contents to the plurality of cellular phone terminals 3 and immediately the contents are displayed in each cellular phone terminal 3, a display start time of the contents could differ with each terminal. In this case, especially in the distribution of moving image contents, if a deviation is caused in the synchronization among the terminals, this is disadvantageous. Moreover, even with static image contents, this is also disadvantageous in a service in which the display start time should be simultaneous.

To solve the problem, when the time is synchronized beforehand as described above, and the server 1 distributes the contents to the plurality of cellular phone terminals 3, the server transmits the timing control information indicating the display start time in addition to the contents, or transmits the timing control information indicating the display start time after the completion of the contents transmission. When the contents start to be displayed in each cellular phone terminal 3 at the indicated display start time, the display start time of the contents can be the same in all the terminals.

In this case, the display start time indicated by the timing control information can be determined in consideration of the maximum delay time $\Delta t_{i\_}$max. For example, a time obtained by adding $\Delta t_{i\_}$max to the time obtained during the transmitting of the information indicating the display start time to each terminal is assumed to be the display start time.

A procedure for arranging the terminals will next be described.

FIG. 16 shows a part related with the procedure for arranging the terminals in the system configuration.

The arrangement-guide contents generation section 13 sets arrangement information in the corresponding session in the session management table 12. The arrangement-guide contents generation section 13 then generates the contents in accordance with the arrangement information, i.e., arrangement-guide contents. The arrangement-guide contents with the apparatus ID of the cellular phone terminal 3 as a destination to the contents are transmitted to the contents transmission section 14.

The contents transmission section 14 refers to a destination apparatus ID in the contents, and transmits the received contents to the corresponding cellular phone terminal 3.

The contents reception section 33 transmits the received contents to the contents display section 34.

The contents display section 34 displays the received contents in the screen.

Figure 17:
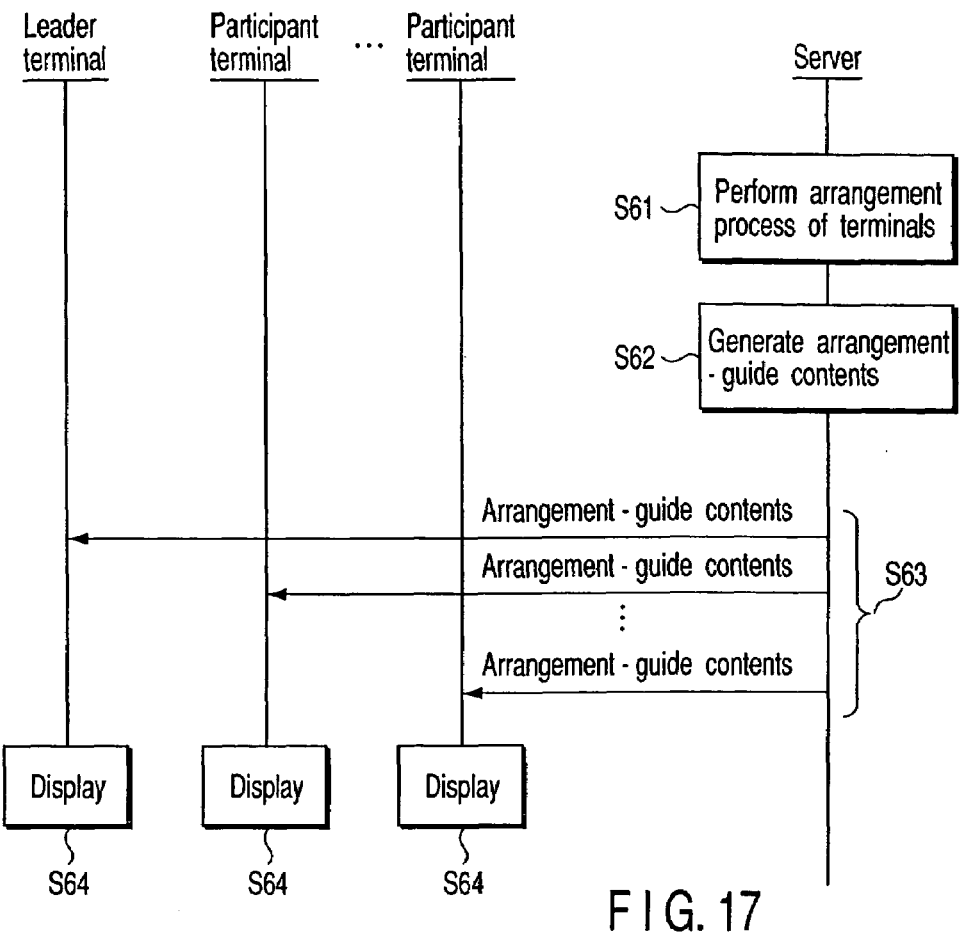
FIG. 17 is a diagram showing one example of the sequence of procedure for arranging the terminals of the embodiment.

FIG. 17 shows one example of the sequence of the procedure for arranging the terminals.

Figure 18:
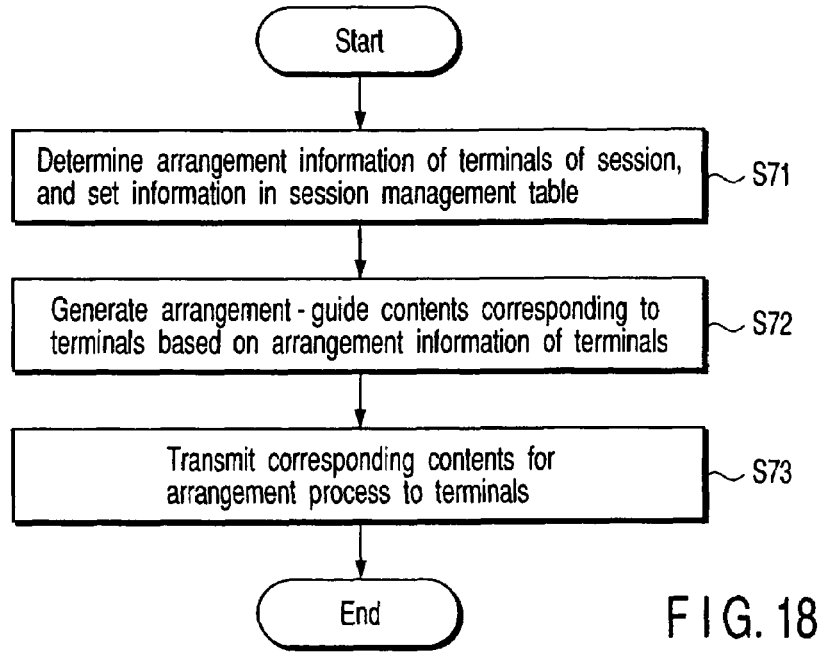
FIG. 18 is a flowchart showing one example of process steps of the server in the procedure for arranging the terminals in the embodiment.

FIG. 18 shows one example of process steps of the server 1 in the procedure for arranging the terminals.

FIG. 19 shows one example of process steps of the cellular phone terminal 3 in the procedure for arranging the terminals.

First, the arrangement-guide contents generation section 13 determines arrangement information of all the cellular phone terminals 3 of the session, and sets the information in the corresponding session of the session management table 12 (S61) (S71).

Here, a method of determining the arrangement information of the terminals will be described.

For the arrangement information to be assigned to each terminal in a certain session (e.g., order from left or right), there are: (1) a method of determining the information based on the order of the terminal registered in the session management table 12 (e.g., the arrangement order is set to be the same as the registered order); (2) a method of determining the information at random; and (3) a method of determining also in consideration of profile information (e.g., a screen size, and types such as monochromatic display and color display).

In the method of determining the arrangement information while considering the profile information, for example, a plurality of types of contents are distributed to the respective terminals, and there is a terminal having a different screen size or a different display type such as the monochromatic display and color display in the plurality of terminals. In this case, the arrangement can be determined so that the contents to be displayed in a larger screen are displayed in the terminal having a larger screen, or so that the contents to be color-displayed are displayed in the terminal capable of displaying the information in colors. Additionally, even in this case, when the profile information of each terminal is the same, another determining method (e.g., the methods (1) or (2)) is used.

There is also a method in which the arrangement information can be designated to the server 1 from the cellular phone terminal 3. Alternatively, there is a method in which a desire about the arrangement information is notified to the server 1 from the cellular phone terminal 3, and the server 1 can also consider the desire and determine the arrangement information.

For the arrangement information determined as described above, in addition to a method of fixing the information through one session, there is also a method in which the information can be changed in accordance with the contents of the service in one session (e.g., the order is shuffled).

Subsequently, the arrangement-guide contents generation section 13 of the server 1 generates the arrangement-guide contents to be transmitted to the cellular phone terminals 3 for a process for arranging the (display screens of) the plurality of cellular phone terminals 3 sharing one session in a predetermined position relation, and using one wide screen or a multi-screen constituted of the plurality of display screens (S62) (S71).

For the arrangement-guide contents, for example, to arrange the plurality of cellular phone terminals 3 in one horizontal row, the contents include the "number" indicating the number of the order of each cellular phone terminal 3 from left or right (additionally, the order from the left or the order from the right is known beforehand), or the number and arrangement direction such as "◯-th from the left" and "◯-th from the right". Instead of the number, the same number of predetermined object images (e.g., animation of a certain character) may also be used. A predetermined image indicating the number (e.g., spots on a dice, and playing card) may also be used. Furthermore, there is also a method in which an arrangement diagram of all the terminals, and an image indicating an arrangement position of the terminal in the arrangement diagram are used.

Moreover, in another example, in the arrangement-guide contents, one static or moving image is divided by the number of terminals in the session. In this case, the contents include a puzzle element in which the cellular phone terminals 3 arranged in a correct arrangement form one static or moving image, and each content is each divided portion of the static or moving image.

The arrangement-guide contents may be divided in a predetermined number beforehand, the prepared contents for the arrangement process may be divided for the distribution, or the contents for the arrangement process are not prepared beforehand and may be generated so as to distribute the contents. Alternatively, these contents may also be used together.

Subsequently, the server 1 transmits the corresponding arrangement-guide contents to the respective cellular phone terminals 3 of the session (S63) (S73). For example, when there are four session terminals, the arrangement-guide content of an image "1" is transmitted to the terminal with position information=1, the arrangement-guide content of an image "2" is transmitted to the terminal with the position information=2, the arrangement-guide content of an image "3" is transmitted to the terminal with position information=3, and the arrangement-guide content of an image "4" is transmitted to the terminal with the position information=4. In this example, the position information is assumed to indicate the order from the left.

Upon receiving the arrangement-guide contents from the server 1 (S63) (S81), the cellular phone terminals 3 display the received contents (S64) (S82).

Figure 20A:
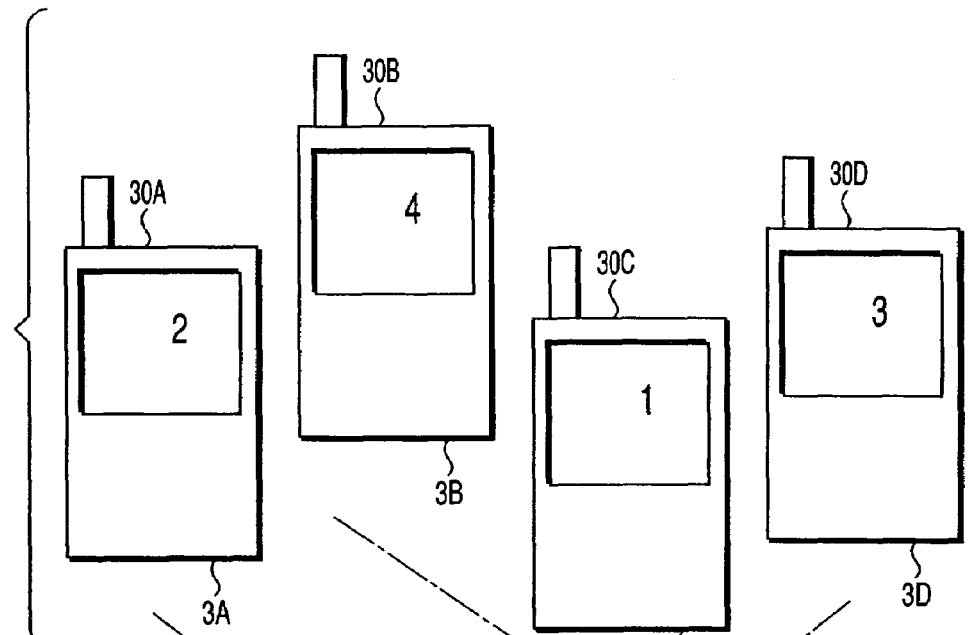
FIGS. 20A and 20B are explanatory views of the procedure for arranging the terminals according to the embodiment.
Figure 20B:
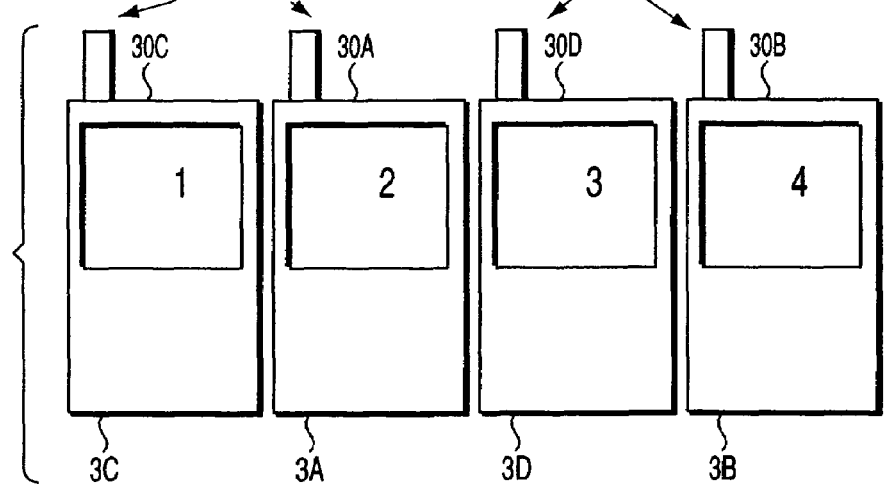

For example, as shown in FIG. 20A, "2", "4", "1", "3" are displayed in four cellular phone terminals 3 in order from the left of the drawing. Thereafter, the users cooperate to arrange the terminals in accordance with the displayed numbers, the arrangement is obtained as shown in FIG. 20B.

Once the terminals are completely arranged, each terminal or session leader terminal may notify the server 1 that the arrangement process has been completed. Moreover, in this case, the terminals may notify the server 1 of the actually arranged order, and allow the server to confirm the order (e.g., when the arrangement-guide contents obtained by dividing one image by the number of terminals of the session are used, it is preferable to perform such confirmation procedure). If the order notified to the server 1 from the cellular phone terminal 3 is wrong, the server 1 may notify all the terminals or the terminal having an actually wrong order that the order is wrong,(e.g., a vibrator of the terminal having the wrong actual order may be operated). Information as a detailed guide for accurately arranging the terminals may be provided to the terminal whose actual order is wrong.

In such the reordering process, sound contents including the notification of the arrangement information can also be used together with or in addition to the image contents.

Moreover, when the cellular phone terminal 3 is set to be capable of designating the arrangement information to the server 1, and the cellular phone terminal 3 designates the arrangement information to the server 1, the terminal arrangement procedure can be skipped (additionally, without skipping the procedure, it can be checked whether the terminals are arranged in a correct order).

Figure 21:
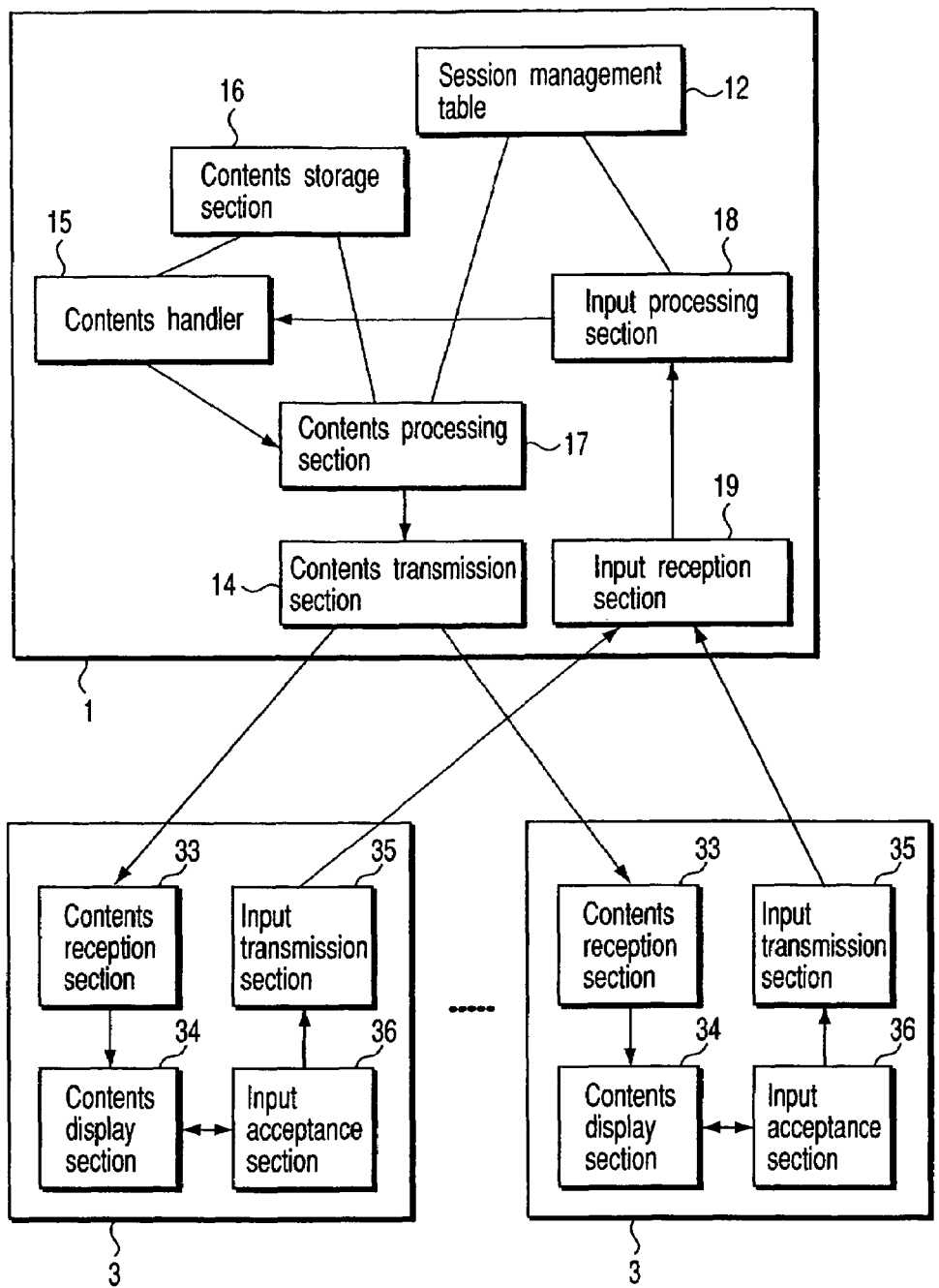
FIG. 21 is a diagram showing a part related with a contents distribution procedure and user input response procedure in the system configuration according to the embodiment.

FIG. 21 shows a part related with a contents distribution procedure and user input response procedure in the system configuration.

Additionally, when the service is limited to a service of transmitting only the contents, the input reception section 19 and input processing section 18 may not be disposed.

Here, when the display screens of a plurality of cellular phone terminals 3 are linked and used as a wide screen, the contents are not prepared by dividing the contents beforehand, and the contents are divided and the contents for the terminals are generated during the distribution of the contents. This example will be described.

The contents storage section 16 of the server 1 store the contents as the object to be presented to the cellular phone terminals 3. Examples of the contents include the static or moving image, static or moving image including voice information, operation screen of the service, and music.

The contents handler 15 controls the selection of the contents to be distributed from the contents stored in the contents storage section 16, processing of the contents by the contents processing section 17, and transmission of the contents by the contents transmission section 14 in accordance with the content of the service or the progress of scenario (or in accordance with the content of the service or the progress of scenario and user input information supplied from the cellular phone terminal 3 via the input processing section 18). Examples of the content of the service include a distribution service of contents of movie or concert, service of providing various information, service of various games, and the like.

The contents processing section 17 refers to the arrangement information of the respective cellular phone terminals 3 of the session management table 12, processes the contents indicated from the contents handler 15 (e.g., divides the contents), adds the corresponding destination apparatus ID to the contents for the respective terminals, and transmits the contents to the contents transmission section 14. Additionally, a configuration including a system of timing control is used, the above-described timing control information is generated and added to the contents for executing the timing control. FIG. 22 shows one example of the contents not including the timing control information, and FIG. 23 shows one example of the contents including the timing control information.

The contents transmission section 14 refers to the destination apparatus ID in the contents, and transmits the received contents to the corresponding cellular phone terminal 3 as described above.

The contents reception section 33 of the cellular phone terminal 3 transmits the received contents to the contents display section 34 as described above.

The contents display section 34 displays the received contents in the screen as described above. Additionally, when the configuration including the system of timing control is used, for the contents including the timing control information, the present time is acquired from the time management section 301, and a timing for displaying the contents is controlled.

On the other hand, the input acceptance section 36 of the cellular phone terminal 3 accepts various inputs of the cellular phone terminal 3 (e.g., button input), and transmits the inputs to the input transmission section 35.

The input transmission section 35 adds the apparatus ID of the terminal to the various received inputs (additionally, a configuration to add the session ID is also possible), and transmits the inputs to the input reception section 19 of the server 1.

The input reception section 19 of the server 1 transmits the user input information transmitted from the cellular phone terminal 3 to the input processing section 18.

The input processing section 18 refers to the user input information received from the input reception section 19 and the session management table 12, adds the corresponding session ID and arrangement information to the user input information, and transmits the information to the contents handler 15 which manages the session.

Figure 24:
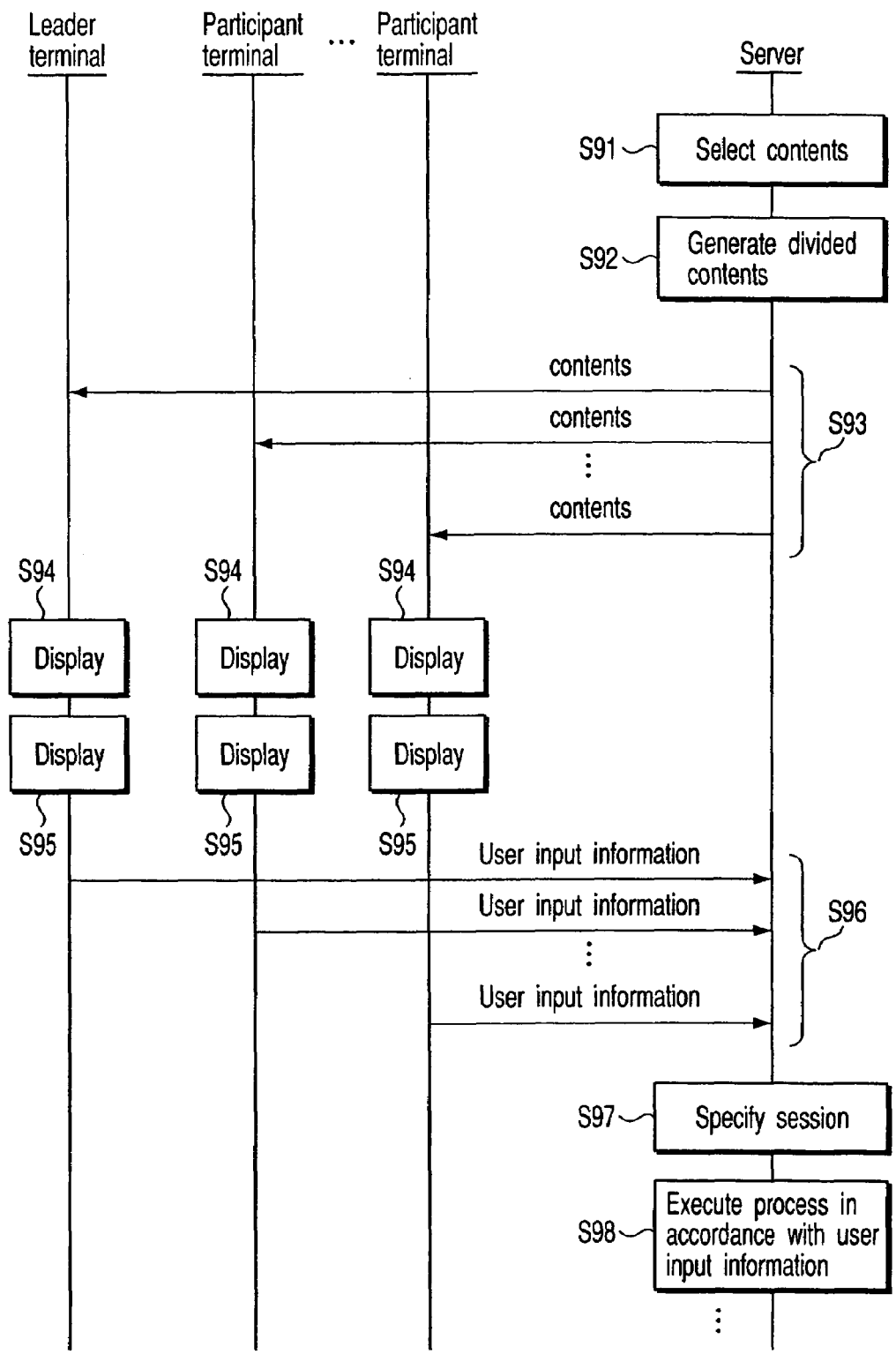
FIG. 24 is a diagram showing one example of the sequence of contents distribution procedure and user input response procedure according to the embodiment.

FIG. 24 shows one example of a sequence of the contents distribution procedure/user input response procedure.

FIG. 25 shows one example of process steps of the server 1 in the contents distribution procedure.

Figure 26:
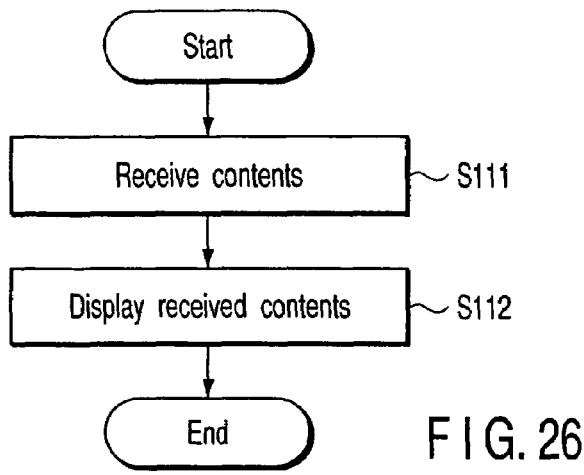
FIG. 26 is a flowchart showing one example of process steps of the cellular phone terminal in the contents distribution procedure of the embodiment.

FIG. 26 shows one example of process steps of the cellular phone terminal 3 in the contents distribution procedure.

Figure 27:
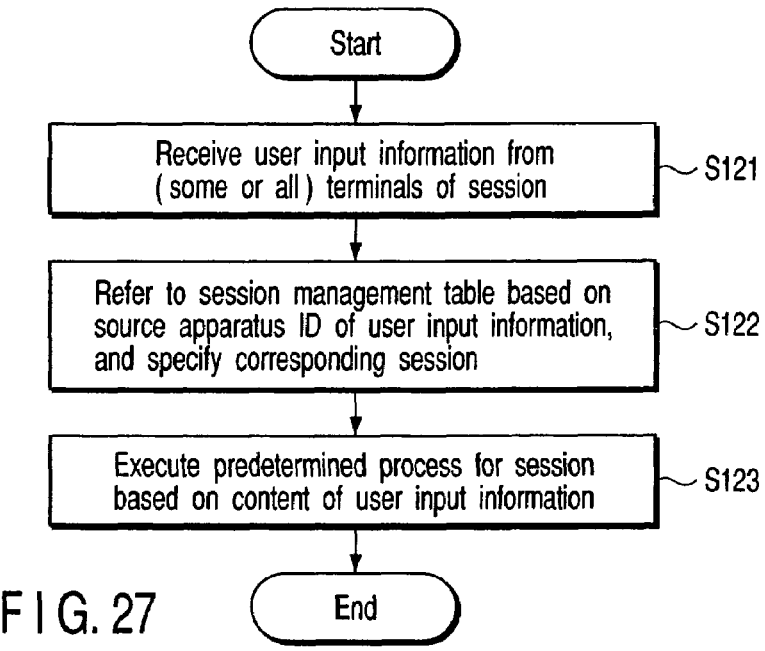
FIG. 27 is a flowchart showing one example of process steps of the server in the user input response procedure of the embodiment.

FIG. 27 shows one example of process steps of the server 1 in the user input response procedure.

Figure 28:
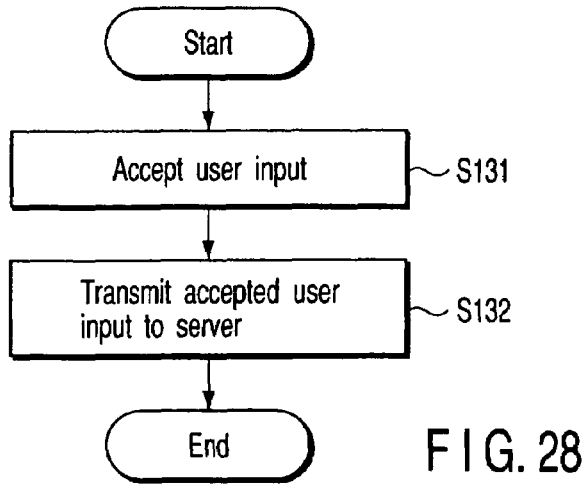
FIG. 28 is a flowchart showing one example of process steps of the cellular phone terminal in the user input response procedure of the embodiment.

FIG. 28 shows one example of process steps of the cellular phone terminal 3 in the user input response procedure.

First, when the procedure of the terminal registration to the terminal arrangement is completed with respect to the session, the contents handler 15 selects one content (e.g., for the use as the wide screen) or a plurality of contents (e.g., for the use as the multi-screen) to be distributed to all the terminals of the session (S91) (S101).

Subsequently, the contents as the object are processed in the form transmittable to the respective terminals sharing the session based on the registered content of the corresponding session of the session management table 12 (S92) (S102).

For example, with the use as the wide screen, the contents as the object are divided into the same number of contents as the number of terminals of the session, and the divided contents are assigned to the respective terminals in accordance with positions where the divided contents are to be arranged and arrangement information of the respective terminals. Moreover, the terminal IDs of the cellular phone terminals 3 to which the contents are to be assigned are added to the respective divided contents. Furthermore, if necessary, the timing control information is added.

Additionally, for example, with the use as the multi-screen, contents groups as the object are assigned to the respective terminals in accordance with the positions where the respective contents of the predetermined object contents group are to be arranged and the arrangement information of the respective terminals. Moreover, the terminal IDs of the cellular phone terminals 3 to which the respective contents are to be assigned are added to the contents. Furthermore, if necessary, the timing control information is added.

Subsequently, the server 1 transmits the corresponding contents to the respective cellular phone terminals 3 of the session (S93) (S103).

Next, upon receiving the contents from the server 1 (S93) (S111), the respective cellular phone terminals 3 display the received contents (S94) (S112).

Additionally, when a plurality of contents or a plurality of contents groups are continuously distributed, steps S91 to S94 are repeatedly executed.

Moreover, when the service is limited to the service of transmitting only the contents, and when the predetermined contents distribution is completed, the session terminates at this time.

On the other hand, in a service whose content changes by dialogue with the server, a service whose scenario makes progress, or a service in which a real-time user operation needs to be returned to the server with respect to the displayed contents, after or during the display of the distributed contents, all or some cellular phone terminals 3 belonging to the session accept the input from the user (S95) (S131).

The cellular phone terminal 3 having received the input from the user transmits the user input information to the server 1 (S96) (S132).

Upon receiving the user input information from (some or all) cellular phone terminals 3 of the session (S96) (S121), the server 1 refers to the session management table, and specifies the corresponding session based on the source apparatus ID of the user input information (S97) (S122).

Subsequently, the predetermined process of the session is executed based on the content of the user input information (S98) (S123). This process varies with the service or the contents. Examples of the process include: a process of allowing the scenario to proceed in accordance with the user input information (e.g., shifting to a phase to distribute the next contents); a speed game in which a response time from when transmitting the contents until receiving the user input information is measured in accordance with the user input information, and results are published or recorded; a game for searching a correct answer, in which correctness is judged in accordance with the user input information, and the results are published or recorded; an information providing service in which the information to be displayed in the terminal is changed in accordance with the user input information; and other variations.

Therefore, all or some of S91 to S98 are repeatedly executed if necessary.

Additionally, here the example has been described in which the display screens of a plurality of cellular phone terminals 3 are linked and used as the wide screen, and the contents are divided and the contents for the respective terminals are generated during the distribution of the contents without preparing the divided contents beforehand. Of course, a configuration in which the contents divided into a predetermined number of contents are prepared beforehand is also possible (several types of contents whose divided numbers are changed may also be prepared beforehand). Moreover, for example, the configuration can also be used for each type of contents.

Several exempla will be described hereinafter.

A first exemplum will be described with reference to FIG. 29.

In this exemplum, a plurality of cellular phone terminals 3A-3D are arranged in one horizontal row and used as one wide screen.

In this service, a so-called jigsaw game is played in a plurality of display screens 30A-30D. That is, for example, four users bring the cellular phone terminals 3A-3D having the function of the present embodiment, perform the above-described procedure, register the terminals in the server 1, and generates the session. In this exemplum, the terminal arrangement procedure is unnecessary.

The server 1 transmits, for example, the contents obtained by dividing one image (either the static image or the moving image) into four to any one of the cellular phone terminals 3. Then, for example, the contents are display in the cellular phone terminals 3 as shown in FIG. 29A.

Figures 29A, 29B:
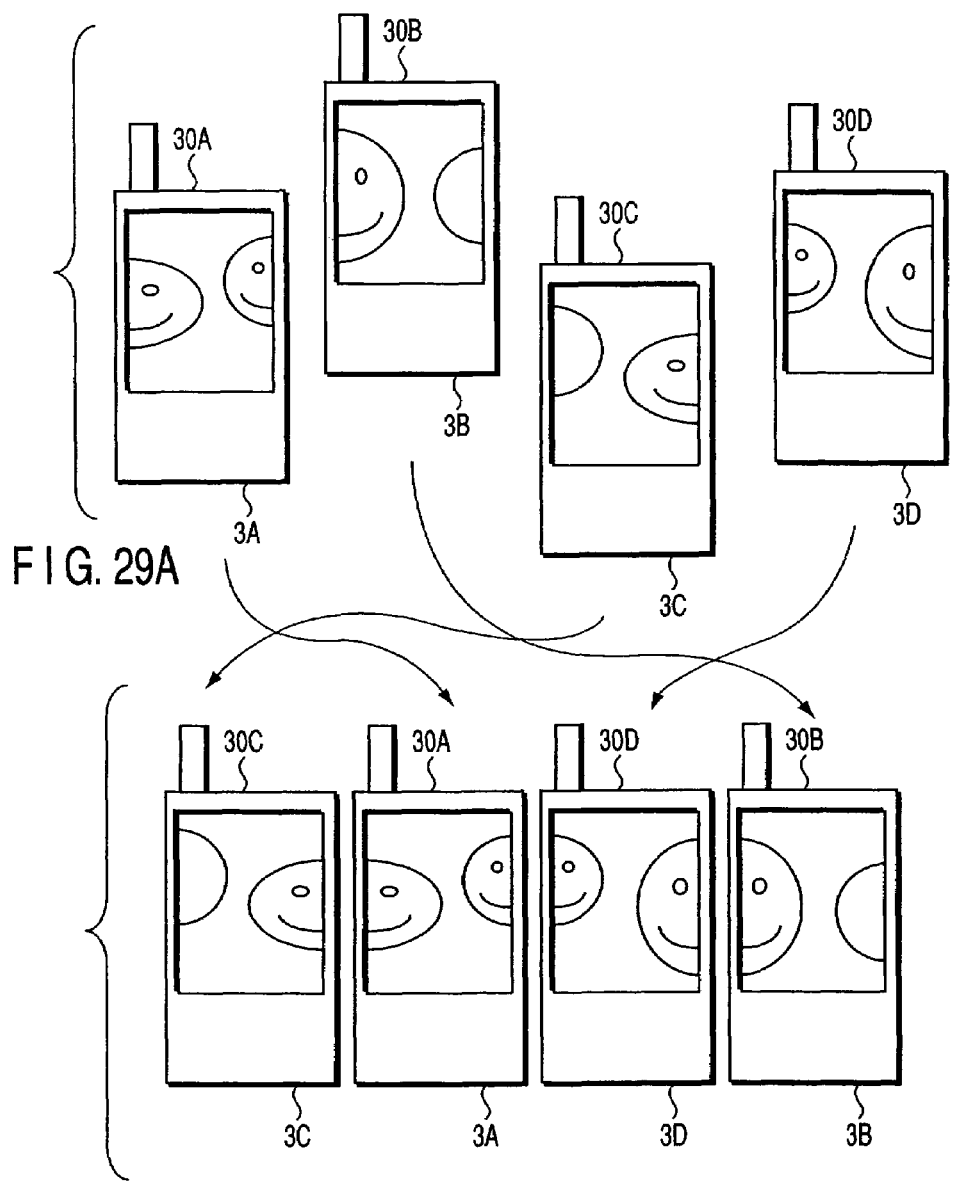
FIGS. 29A and 29B are explanatory views of a first exemplum.

Four users refer to and arrange the images displayed in four cellular phone terminals 3A-3D, so that a correct answer is obtained as shown in FIG. 29B.

To continue the game, the server 1 transmits the contents obtained by dividing another image into four to the respective cellular phone terminals 3 (additionally, the correspondence between the order of the images and the order of the terminals in the previous game is changed).

Of course, a service in which a speed for arranging the images, a correct answer ratio, or the number of cleared images is competed for, the data is collected by the server 1, and a ranking is announced is also possible. Moreover, a game mode in which one session is divided into a plurality of groups (a plurality of wide screens are formed) is also possible.

Additionally, this service can also be performed as the cellular phone arranging-procedure. That is, first the jigsaw game is played and the cellular phone terminals 3 can be arranged as in the arrangement information.

A second exemplum will be described with reference to FIG. 30.

This exemplum is another one of a service in which a plurality of cellular phone terminals 3A-3D are arranged in one horizontal row and used as one wide screen.

In this service, a game is played based on the moving image displayed in the wide screen. That is, for example, four users bring the cellular phone terminals 3A-3D having the function of the present embodiment, perform the above-described procedure, register the terminals in the server 1, and generate the session.

Subsequently, after the terminal arrangement procedure is completed, the server 1 transmits, for example, the contents obtained by dividing one moving image content into four to any one of the cellular phone terminals 3. In this case, the above-described timing control is executed.

Figure 30A:
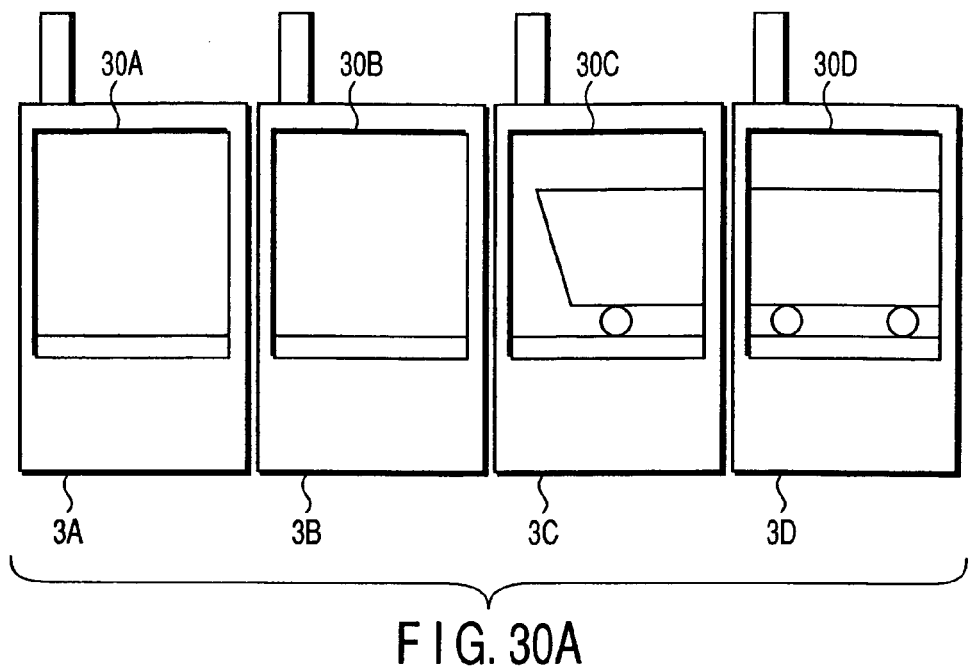
FIGS. 30A and 30B are explanatory views of a second exemplum.
Figure 30B:
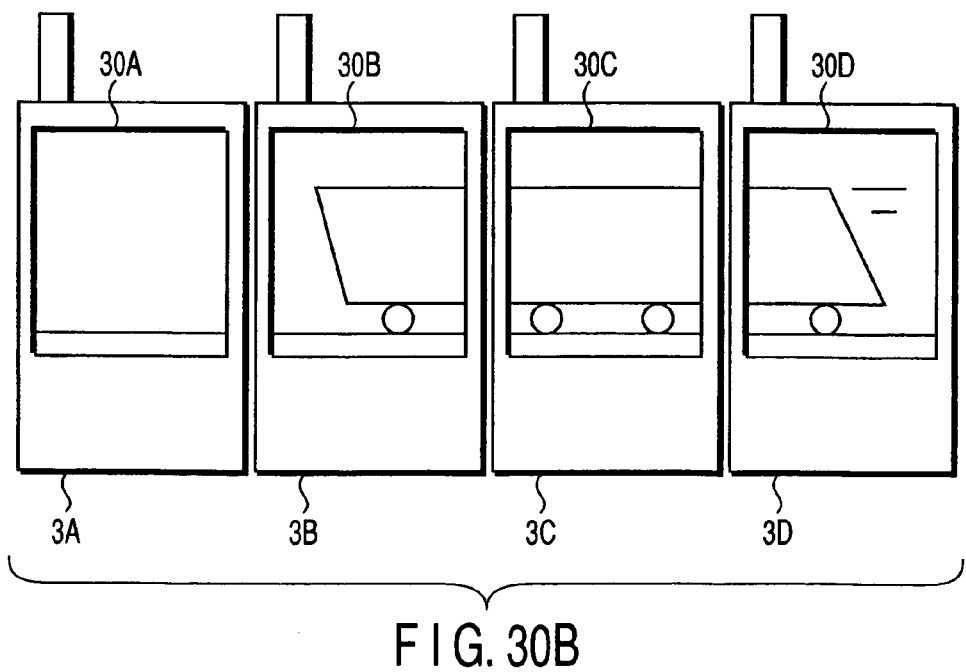

The respective cellular phone terminals 3 having received the contents start displaying the respective contents simultaneously at a designated time. Then, an image of a running train is displayed as shown in FIGS. 30A, 30B.

Four users refer to the image displayed in the wide screen, and answer questions (e.g., the number of passengers in the train is guessed).

A third exemplum (example of a multi-screen mode) will be described with reference to FIG. 31.

This is an exemplum of a service in which a plurality of cellular phone terminals 3A-3C are used as the multi-screen.

In this service, three cellular phone terminals 3A-3C sharing one session, any one of the cellular phone terminals 3A-3C designates departure and arrival stations and issues an information providing request to the server 1. The server 1 transmits a departure station peripheral map, route information, and arrival station peripheral map to the respective cellular phone terminals 3A-3C.

For example, three users bring the cellular phone terminals 3A-3C having the function of the present embodiment, perform the above-described procedure, register the terminals in the server 1, and share the session.

Here, it is assumed that the terminal arrangement procedure is performed. For example, it is assumed that the terminal 3A for displaying the departure station peripheral map is disposed in the left, the terminal 3B for displaying the route information is disposed in the middle, and the terminal 3C for displaying the arrival station peripheral map is disposed in the right.

The server 1 selects the corresponding departure station peripheral map (A station peripheral map), corresponding route information (X electric railroad route map including A and B stations), and corresponding arrival station peripheral map (B station peripheral map) based on the designated departure station (A station) and arrival station (B station), and transmits these to the terminals 3A-3C for displaying the departure station peripheral map, route information, and arrival station peripheral map.

Figure 31A:
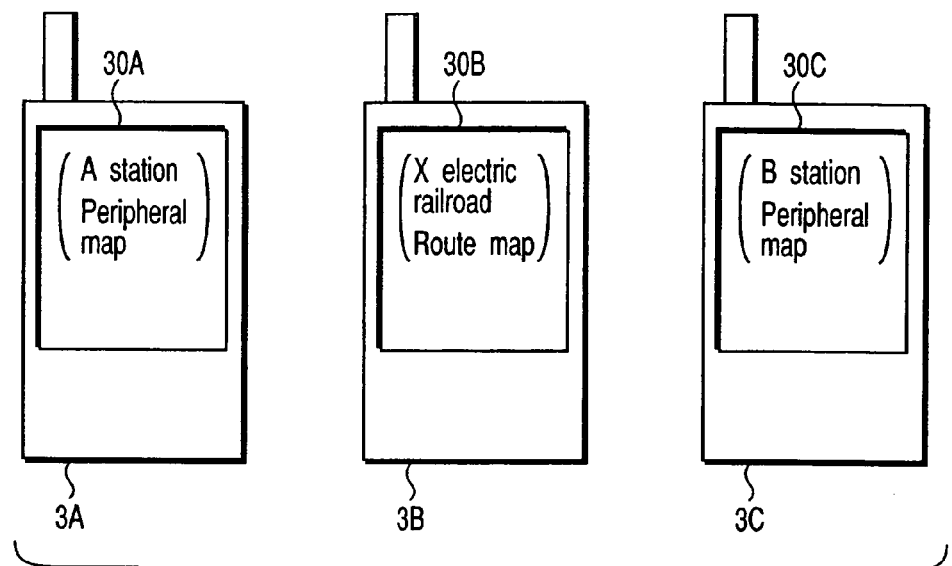
FIGS. 31A and 31B are explanatory views of a third exemplum.

Then, the information is displayed, for example, as shown in FIG. 31A.

Here, for example, it is assumed that any one of the cellular phone terminals 3A-3C transmits an instruction to change the arrival station to C station to the server 1.

The server 1 selects the route information (Y electric railroad route map including A to C stations), and arrival station peripheral map (C station peripheral map) corresponding to the change, and transmits these to the terminals 3B and 3C for displaying the route information and arrival station peripheral map.

Figure 31B:
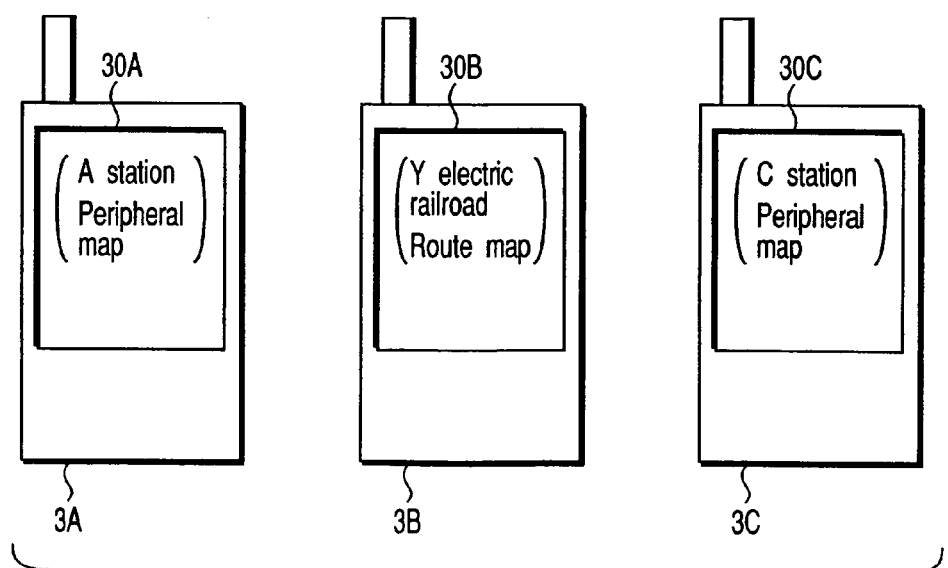

Then, the information is updated, for example, as shown in FIG. 31B.

Moreover, the example in which three terminals share the session has been described above, but four terminals may share the session, and a transfer station peripheral map is added to the above-described three pieces of information. In this manner, variations are possible.

Furthermore, with respect to the image contents, the example in which a plurality of cellular phone terminals are connected and the wide screen and multi-screen are realized has mainly been described above. However, of course, a system of distributing the contents including voice and image to the respective cellular phone terminals from the server is also possible such as a game including movies, effect sound and background music. In this case, with respect to the sound contents, there are various methods such as: a method of distributing the same contents to the respective cellular phone terminals; a method of distributing right-channel sound and left-channel sound only to the cellular phone terminals corresponding to right and left ends, respectively; a method of distributing right-channel sound, middle-channel sound, and left-channel sound only to the cellular phone terminals corresponding to right end, middle and left end, respectively; and a method of distributing musical performance information divided by a unit of a part of musical composition or by a unit of note of score to the respective cellular phone terminals.

Moreover, with respect to the contents excluding the image and including only the sound, it is also possible to link a plurality of cellular phone terminals. In this case, the plurality of cellular phone terminals can be used as a multi-channel speaker group. For example, as described above, there are various methods such as: a method of distributing the sound of the corresponding channel to the cellular phone terminal disposed in each position (e.g., a method of distributing the sounds of the right, middle and left channels only to the cellular phone terminals corresponding to the right end, middle and left end, respectively); and a method of distributing the performance information divided by the unit of the part of the composition or the unit of the note of the score to the respective cellular phone terminals.

That is, for example, two users gather, and can enjoy stereo broadcasting by the two cellular phone terminals. Alternatively, musical instruments are assigned to several cellular phone terminals, and the composition can be reproduced/outputted. Alternatively, even when there is a restriction on a performance function of each cellular phone terminal, but when a plurality of cellular phone terminals cooperate, the performance can be realized beyond the restriction.

Additionally, a system including only the above-described configuration concerning the image contents, system including only the configuration concerning the sound contents, and system including both the configurations are considered. With the system including only the configuration concerning the sound contents, the terminal arrangement procedure may be performed according to a voice guide.

Moreover, in addition to the above-described link, for example, a plurality of user interfaces (e.g., input buttons, GUI, and the like) of the cellular phone terminals are linked, and it is possible to realize a user interface which can more easily be used.

Furthermore, various other link methods are considered.

Additionally, the cellular phone terminals have been described above, but the present invention can also be applied to a mobile or small-sized calculator having a radio communication function, and a mobile or small-sized calculator which can be connected to and communicated with the cellular phone terminal.

Moreover, the above-described functions can be realized as software.

Furthermore, the present embodiment can also be implemented as a program for allowing a computer to execute predetermined means (allowing the computer to function as the predetermined means, or allowing the computer to realize the predetermined function), and can also be implemented as a recording medium which can be read by the computer with the program recorded therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A content distribution method, comprising:
accepting registration requests to register a set of clients with a server, where the set of clients includes two or more clients;
receiving a request from at least one of the registered set of clients;
distributing a set of contents-pieces to the registered set of clients upon receiving the request,
determining an order of the registered set of clients;
selecting the respective contents-pieces in accordance with the determined order;
measuring delay times of transmission between the server and each set of clients; and
controlling timings of transmitting the contents-pieces to each set of clients based on the delay times for a simultaneous contents reproduction at the clients;
generating arrangement-guide contents corresponding to the order of the registered set of clients;
transmitting the arrangement-guide contents to the registered set of clients in addition to the contents-pieces for guiding how to arrange the clients; and
transmitting timing information representing timings of reproducing the contents-pieces to the registered set of clients,
wherein each client receives respective contents-pieces corresponding to each client, the set of contents-pieces being a meaningful content,
wherein the meaningful content is jointly formed by the set of contents-pieces when the set of clients reproduce the set of contents-pieces in a reproduction session,
wherein the timings are aligned to that of one client having the longest delay time from the server,
wherein the set of clients include cellular phone terminals, and
wherein the contents-pieces are transmitted thereto through a data communication other than a telephone communication.

2. A method according to claim 1, wherein the clients arranged in accordance with the arrangement-guide contents form a wide screen and wherein each of the clients displays one of the contents-pieces corresponding to a region of an image.

3. A method according to claim 1, wherein the clients arranged in accordance with the arrangement-guide contents form a multi-screen and wherein each of the clients displays one of the contents-pieces in accordance with a predetermined layout of the multi-screen.

4. A server apparatus which distributes multiple-contents containing contents-pieces to a set of clients, where the set of the clients includes two or more clients, the server apparatus comprising:

a storage device which stores the multiple-contents;

an accepting device which accepts registration requests to register the set of clients with the server apparatus;

a receiving device which receives a request from at least one of the registered set of clients;

a contents handler which handles the multiple-contents in the storage device, wherein the contents handler selects the contents-pieces of the multiple-contents;

a distribution controller which controls a distribution of the multiple-contents, wherein the distribution controller transmits the contents-pieces of the multiple-contents selected by the contents handler to the registered set of clients;

a determining device which determines an order of the registered set of clients;

a measuring unit which measures delay times of transmission between the server apparatus and each set of clients;

a contents generator which generates arrangement-guide contents corresponding to the order of the registered set of clients, wherein the contents handler selects the respective contents-pieces in accordance with the determined order, wherein the distribution controller controls timings of transmitting the contents-pieces to each set of clients based on the delay times for a simultaneous contents reproduction at the clients, wherein the timings are aligned to that of one client having the longest delay time from the server apparatus, wherein the distribution controller transmits the arrangement-guide contents to the clients in addition to the contents-pieces for guiding how to arrange the clients, and wherein the distribution controller further transmits timing information representing timings of reproducing the contents-pieces to the registered set of clients.

5. A mobile terminal which communicates with a server apparatus distributing a set of contents-pieces, the set of contents-pieces being a meaningful content, the mobile terminal comprising:

a request sender which sends a registration request to the server apparatus in order to share a session with other mobile terminals;

a contents receiver which receives one of the set of contents-pieces assigned to the mobile terminal from the server apparatus; and a reproduction device which reproduces the received one of the set of contents-pieces in a reproduction session wherein the meaningful content is jointly formed by the set of contents-pieces when a plurality of mobile terminals reproduce the set of contents-pieces in the session wherein the contents receiver also receives arrangement-guide contents for guiding how to arranged the mobile terminal among the other mobile terminals, wherein the reproduction device forms a part of a wide screen when the mobile terminal is arranged in accordance with the arrangement-guide contents, wherein the reproduction device forms a part of a multi-screen when the mobile terminal is arranged in accordance with the arrangement-guide contents, wherein the contents receiver is coupled to a data communication link other than a telephone communication link wherein the contents receiver further receives a timing instruction from the server, and wherein the reproduction device reproduces the received one of the contents-pieces in accordance with the timing instruction.

6. A computer-readable medium having a computer-executable instructions stored therein, when executed, said instructions causing a computer to distribute a set of contents-pieces stored in a storage device to a set of clients, where the set of clients including two or more clients, the set of contents-pieces being a meaningful content, the instructions comprising:

a first code segment for accepting registration requests to register the set of clients with the computer;

a second code segment for determining relative locations of the registered set of clients to which the contents-pieces are transmitted;

a third code segment for handling the set of contents-pieces in the storage device, by selecting one of the set of the contents-pieces in accordance with the relative locations of the set of clients; and a fourth code segment for distributing the set of contents-pieces, by transmitting the selected one of the set of contents-pieces to the registered set of clients a fifth code segment for determining an order of the registered set of clients;

a sixth code segment for selecting the respective contents-pieces in accordance with the determined order;

a seventh code segment for measuring delay times of transmission between the server and each set of clients; and an eighth code segment for controlling timings of transmitting the contents-pieces to each set of clients based on the delay times for a simultaneous contents reproduction at the clients;

a ninth code segment for generating arrangement-guide contents corresponding to the order of the registered set of clients;

a tenth code segment for transmitting the arrangement-guide contents to the registered set of clients in addition to the contents-pieces for guiding how to arrange the clients; and an eleventh code segment for transmitting timing information representing timings of reproducing the contents-pieces to the registered set of clients, and wherein the meaningful content is jointly formed by the set of contents-pieces when the set of clients reproduce the set of contents-pieces in a reproduction session wherein the timings are aligned to that of one client having the longest delay time from the server, wherein the clients arranged in accordance with the arrangement-guide contents form a multi-screen and wherein each of the clients displays one of the contents-pieces in accordance with a predetermined layout of the multi-screen, wherein the set of clients include cellular phone terminals, and wherein the contents-pieces are transmitted thereto through a data communication other than a telephone communication.

7. A computer-readable medium having a computer-executable instructions stored therein, when executed, said instructions causing a computer in a mobile terminal to communicate with a server apparatus distributing a set of contents-pieces, the set of contents-pieces being a meaningful content, the instructions comprising:

a first code segment for sending a registration request to the server apparatus in order to share a session with two or more mobile terminals;

a second code segment for receiving one of the set of contents-pieces assigned to the computer from the server apparatus; and a third code segment for reproducing the received one of the set of contents-pieces in a reproduction session, a fourth code segment for receiving the arrangement-guide contents in addition to the contents-pieces for guiding how to arrange the mobile terminals; and a fifth code segment for receiving timing information representing timings of reproducing the contents-pieces to the registered set of mobile terminals, wherein the meaningful content is formed by the set of contents-pieces when a plurality of computers reproduce the set of contents-pieces in the reproduction session, wherein the timings are aligned to that of one mobile terminal having the longest delay time from the server, wherein the mobile terminals arranged in accordance with the arrangement-guide contents form a multi-screen and wherein each of the mobile terminals displays one of the contents-pieces in accordance with a predetermined layout of the multi-screen, wherein the set of mobile terminals include cellular phone terminals, and wherein the contents-pieces are transmitted thereto through a data communication other than a telephone communication.

\* \* \* \* \*